US012693113B2

(12) United States Patent
Homma

(10) Patent No.: US 12,693,113 B2
(45) Date of Patent: Jul. 28, 2026

(54) OPTICAL DISPLACEMENT METER

(71) Applicant: Keyence Corporation, Osaka (JP)

(72) Inventor: Tatsuro Homma, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 83 days.

(21) Appl. No.: 18/780,584

(22) Filed: Jul. 23, 2024

(65) Prior Publication Data

US 2025/0076035 A1     Mar. 6, 2025

(30) Foreign Application Priority Data

Aug. 30, 2023    (JP) ................................. 2023-139438

(51) Int. Cl.
*G01B 11/25*          (2006.01)
*G01B 11/02*          (2006.01)
(52) U.S. Cl.
CPC .......... *G01B 11/254* (2013.01); *G01B 11/026* (2013.01)
(58) Field of Classification Search
CPC ............................ G01B 11/026; G01B 11/254
See application file for complete search history.

(56) References Cited

U.S. PATENT DOCUMENTS

| 10,746,529 | B1 | 8/2020 | Miyagawa |
| 10,746,536 | B2 | 8/2020 | Tsuchida |
| 10,767,976 | B2 | 9/2020 | Tsuchida |
| 10,921,114 | B2 | 2/2021 | Fuyuno et al. |

| 11,073,376 | B2 | 7/2021 | Fuyuno |
| 11,112,236 | B2 | 9/2021 | Homma |
| 11,293,749 | B2 | 4/2022 | Tsuchida |
| 11,747,136 | B2 | 9/2023 | Fujimoto |
| 12,000,688 | B2 | 6/2024 | Kanayama et al. |
| 2008/0088856 | A1* | 4/2008 | Nishio ................. G01B 11/026 |
| | | | 356/623 |

(Continued)

FOREIGN PATENT DOCUMENTS

| CN | 210664364 U | 6/2020 |
| EP | 3232152 A1 | 10/2017 |

OTHER PUBLICATIONS

U.S. Appl. No. 19/095,066, filed Mar. 31, 2025 (58 pages).

(Continued)

*Primary Examiner* — Hina F Ayub
(74) *Attorney, Agent, or Firm* — Kilyk & Bowersox, P.L.L.C.

(57)          ABSTRACT

An optical displacement meter includes a light projecting unit that irradiates a workpiece with slit light, an image sensor that outputs a light receiving amount distribution of reflected light from the workpiece, a motor, a control unit that controls the motor, causes the slit light to scan, and exposes the image sensor while rotating the image sensor, and a rotation angle acquisition unit that acquires a reference angle corresponding to an exposure period of the image sensor. The control unit acquires a peak position in a V direction of the light receiving amount distribution during the exposure period, and estimates a representative angle at which the peak position is acquired based on the reference angle corresponding to the exposure period and a control condition of the image sensor or the motor, and calculates a height of the workpiece at the representative angle from the peak position.

19 Claims, 20 Drawing Sheets

(56) References Cited

U.S. PATENT DOCUMENTS

2024/0271925 A1    8/2024   Kanayama et al.

OTHER PUBLICATIONS

U.S. Appl. No. 19/095,069, filed Mar. 31, 2025 (64 pages).
U.S. Appl. No. 18/780,568, filed Jul. 23, 2024 (61 pages).
U.S. Appl. No. 18/780,601, filed Jul. 23, 2024 (38 pages).
U.S. Appl. No. 18/780,619, filed Jul. 23, 2024 (47 pages).
U.S. Appl. No. 18/780,680, filed Jul. 23, 2024 (91 pages).
U.S. Appl. No. 18/780,710, filed Jul. 23, 2024 (92 pages).

* cited by examiner

FIG. 15
| ENCODER RAW VALUE | $\theta$ | 0.01 | 0.12 | 0.15 |
|---|---|---|---|---|
| CORRECTION VALUE IN B DIRECTION | $\Delta\theta$ | 0.003 | 0.003 | 0.003 |
| AFTER CORRECTION | $\theta+\Delta\theta$ | 0.013 | 0.123 | 0.153 |
| CORRECTION VALUE IN C DIRECTION | $\Delta\theta$ | −0.003 | −0.003 | −0.003 |
| AFTER CORRECTION | $\theta+\Delta\theta$ | 0.007 | 0.117 | 0.147 |
FIG. 16
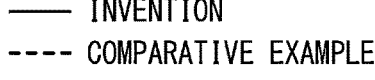
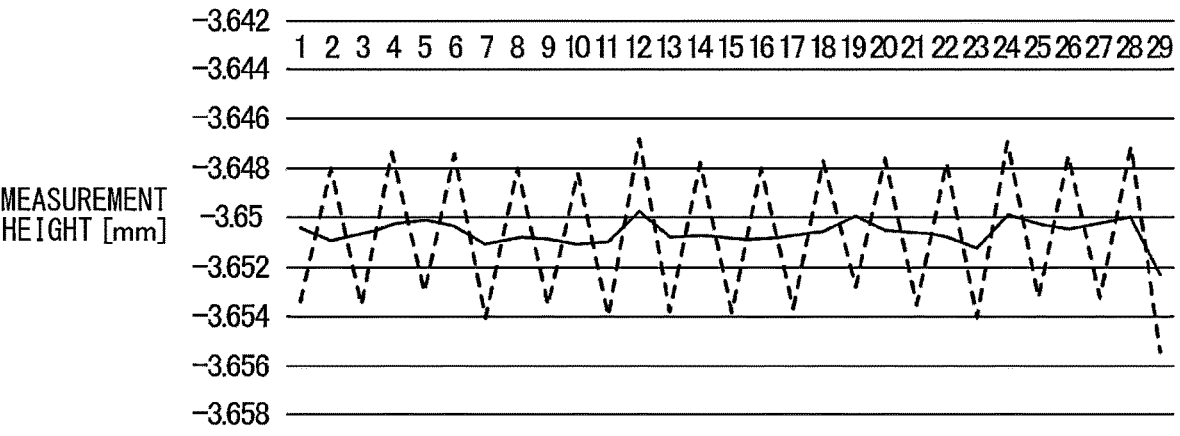
NUMBER OF TIMES OF MEASUREMENT EXECUTION

FIG. 22

UP (X DIRECTION)

DOWN

LEFT ⟷ RIGHT (Y DIRECTION)

OPTICAL DISPLACEMENT METER

CROSS-REFERENCE TO RELATED APPLICATIONS

The present application claims foreign priority based on Japanese Patent Application No. 2023-139438, filed Aug. 30, 2023, the contents of which are incorporated herein by reference.

BACKGROUND OF THE INVENTION

1. Technical Field

The disclosure relates to an optical displacement meter that measures displacement of a workpiece by using light.

2. Description of the Related Art

As an optical displacement meter, for example, there is known an optical displacement meter configured to be able to acquire an XZ sectional profile by irradiating a workpiece with slit light extending in an X direction and receiving reflected light reflected on a surface of the workpiece by an image sensor. It is possible to generate data of a three-dimensional shape of the workpiece by acquiring a plurality of XZ sectional profiles at different positions in a Y direction of the workpiece. However, in this case, equipment such as a conveyor for conveying the workpiece in the Y direction and a linear motion mechanism for moving a displacement meter body in the Y direction with respect to the workpiece is required, and introduction may be difficult.

On the other hand, for example, as in EP3232152A and CN210664364Y, a structure in which a light projecting system that projects slit light and a light receiving system that receives reflected light (collectively referred to as a light projecting and receiving system) is configured to be rotatable and the light projecting and receiving system is rotated such that the slit light is scanned in a Y direction with respect to the workpiece is known.

Incidentally, for example, in a case where the displacement meter body is moved by the linear motion mechanism, the displacement meter body continues to move relative to the workpiece during the exposure period for generating one profile.

At this time, since a positional relationship between an optical system of the displacement meter body and a reference surface on which the workpiece is mounted does not substantially change, an error due to the relative movement does not occur in the obtained height data.

However, as in EP3232152A and CN210664364Y, in a case where measurement is performed by rotating the light projecting and receiving system with respect to a stationary workpiece, since a measurement region has an arc shape due to the rotation of the light projecting and receiving system, the positional relationship between the optical system and the reference surface on which the workpiece is mounted changes depending on a rotation angle of the light projecting and receiving system. Thus, since the height data obtained during the exposure period does not become the height at a start point in time of the exposure period, an error in the height data is caused.

SUMMARY OF THE INVENTION

The disclosure has been made in view of such a point, and an object of the disclosure is to suppress an error in height data in a displacement meter that measures a height by rotating a light projecting and receiving module with respect to a stationary workpiece.

In order to achieve the above object, in one embodiment, an optical displacement meter that measures displacement of a workpiece by using light can be assumed. An optical displacement meter includes a light projecting unit that irradiates a workpiece with slit light extending in an X direction, an image sensor that has a plurality of pixels two-dimensionally arrayed in a U direction corresponding to the X direction and a V direction orthogonal to the U direction, and outputs a light receiving amount distribution of reflected light from the workpiece by the plurality of pixels, a motor that integrally rotates the light projecting unit and the image sensor, a control unit that controls the motor, causes the slit light to scan in a direction orthogonal to the X direction, and exposes the image sensor while rotating the image sensor in the direction, and a rotation angle acquisition unit that acquires a reference angle corresponding to an exposure period of the image sensor. The control unit acquires a peak position in the V direction of the light receiving amount distribution acquired by accumulating charges in the plurality of pixels while rotating the image sensor during the exposure period, and estimates a representative angle at which the peak position is acquired based on the reference angle corresponding to the exposure period and a control condition of the image sensor or the motor, and calculates a height of the workpiece in a Z direction at the representative angle from the peak position.

According to this configuration, when the light projecting unit and the image sensor are integrally rotated by the motor, the slit light extending in the X direction with respect to the workpiece is scanned in the direction orthogonal to the X direction. As a result, it is possible to measure the height at different positions of the workpiece and generate the sectional profile at each of the different positions in the scanning direction while eliminating the need for equipment such as a conveyor for conveying the workpiece in the Y direction and the linear motion mechanism for moving the displacement meter body in the Y direction with respect to the workpiece.

The reference angle corresponding to the exposure period is acquired by the rotation angle acquisition unit at the predetermined timing. However, since the rotational motion continues during the exposure period, in a case where the peak position in the V direction of the light receiving amount distribution acquired by the control unit corresponds to the rotation angle at the timing different from the predetermined timing of the exposure period, the error occurs when the height is calculated from the reference angle and the peak position in the V direction. Therefore, the representative angle at which the peak position in the V direction is acquired is estimated based on the control condition of the image sensor or the motor, and thus, it is possible to obtain accurate height data in the Z direction at the representative angle.

As described above, since the representative angle is estimated based on the control condition of the image sensor or the motor and the reference angle, it is possible to suppress the error in the height data when the height is measured by rotating the light projecting and receiving module with respect to the stationary workpiece.

BRIEF DESCRIPTION OF THE DRAWINGS

FIG. 15 is a diagram illustrating an example of a correction table;

FIG. 16 is a graph showing measurement errors according to the invention and a comparative example;

FIG. 22 is a diagram corresponding to FIG. 7 according to the second embodiment.

DETAILED DESCRIPTION

Hereinafter, embodiments of the invention will be described in detail with reference to the drawings. Note that, the following description of preferred embodiments is merely exemplary in nature and is not intended to limit the invention, an application thereof, or an intended use thereof.

First Embodiment

Figure 1:
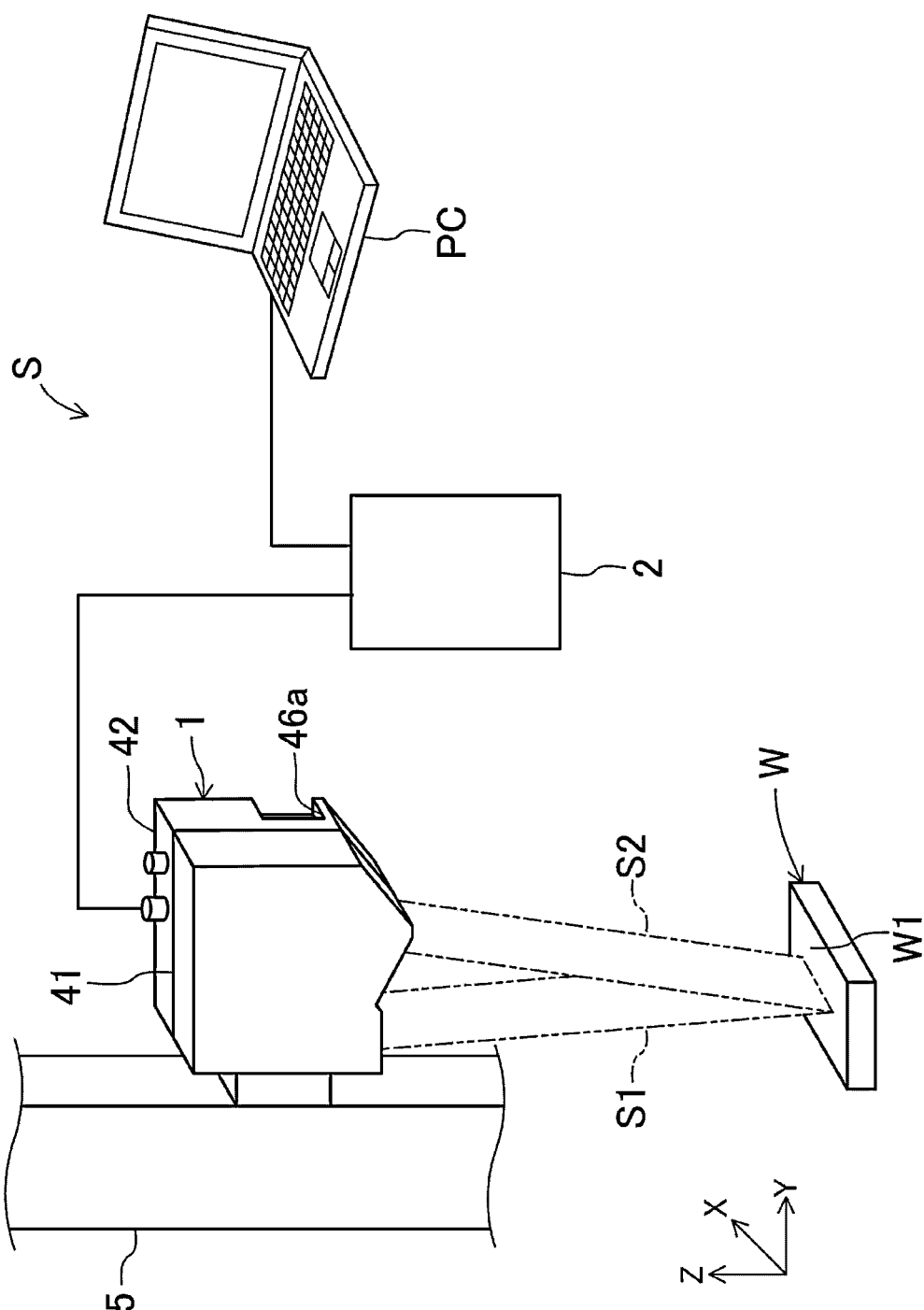
FIG. 1 is a diagram for explaining an optical displacement meter according to a first embodiment of the invention at the time of an operation.

FIG. 1 is a diagram illustrating an optical displacement meter 1 according to a first embodiment of the invention at the time of an operation. The optical displacement meter 1 is an example of an optical displacement meter of a light sectioning method that measures a sectional profile of a workpiece W (measurement object) having a height in a Z direction by using slit light S1 based on the principle of triangulation. In the present embodiment, although an example in which an inspection system S includes the optical displacement meter 1, a controller 2, and a personal computer PC will be described, the invention is not limited to this configuration example, and for example, a programmable logic controller (PLC) or the like may be included in the inspection system S.

At the time of setting before an operation of the inspection system S, for example, various inspection settings can be performed by the controller 2 and the personal computer PC. At the time of an operation after setting, the optical displacement meter 1 measures displacement of the workpiece W at a predetermined timing. Data indicating a measurement result is transmitted from the optical displacement meter 1 to the controller 2 or the personal computer PC, and the inspection based on the inspection setting is executed. The data indicating the measurement result of the optical displacement meter 1, an inspection result, and the like can be stored in the controller 2 or the personal computer PC.

At the time of the operation, it is also possible to operate only the optical displacement meter 1 without using the controller 2 and the personal computer PC, and an operation mode is not limited to the operation mode illustrated in FIG. 1. Note that, in the following description, although the inspection system S including the optical displacement meter 1 will be described, the invention is also applicable to a case where the inspection system S is operated only by the optical displacement meter 1 or a case where the inspection system S is operated by a system in which the optical displacement meter 1 and the PLC are combined.

The inspection system S is a system that executes appearance inspection of the workpiece W in-line. In the in-line appearance inspection, for example, the appearance inspection of the workpiece W is sequentially executed at a site where a plurality of workpieces W are sequentially conveyed. As illustrated in FIG. 1, an X direction, a Y direction, and a Z direction of the workpiece W are defined. The X direction and the Y direction are directions orthogonal to each other in plan view of the workpiece W. The Z direction is a height direction of the workpiece W, and is a direction orthogonal to the X direction and orthogonal to the Y direction. Although the X direction of the workpiece W can be referred to as a depth direction of the workpiece W, and the Y direction of the workpiece W can be referred to as a width direction of the workpiece W, this definition is an example, and the X direction, the Y direction, and the Z direction of the workpiece W can be randomly defined.

Since height data of the workpiece W can be acquired by the optical displacement meter 1, the appearance inspection includes dimensional inspection, shape inspection, defect inspection, and the like based on the height data. The workpiece W is not particularly limited, and examples thereof include various components, members, devices, instruments, and parts thereof. The workpiece W can also be referred to as a measurement object. After the workpiece W is conveyed to a measurable region of the optical displacement meter 1 by a conveying device (not illustrated), the displacement is measured by the optical displacement meter 1.

The optical displacement meter 1 is used, for example, in a state of being fixed to an attachment member 5. The attachment member 5 is a part of equipment installed in a factory or the like, and is fixed not to move relative to the workpiece W. Thus, the optical displacement meter 1 also does not move relative to the workpiece W. Although details will be described later, even though the optical displacement meter 1 is fixed to the attachment member 5, an internal projecting and receiving module 10 (illustrated in FIG. 4) can rotate about an axis parallel to the X direction, and thus, the slit light S1 extending in the X direction of the workpiece W is scanned from a light projecting and receiving module 10 in a direction orthogonal to the X direction of the workpiece W. As a result, reflected light S2 reflected at a plurality of locations in the Y direction on a surface W1 of the workpiece W can be received by the light projecting and receiving module 10. As described above, even in a case where the light projecting and receiving module 10 is rotated about the axis parallel to the X direction, the surface W1 of the workpiece W can be scanned with the slit light S1 as in a case where the workpiece W or the optical displacement meter 1 is linearly moved. Note that, since the optical displacement meter 1 scans the slit light S1 by rotating the light projecting and receiving module 10, a scanning direction of the slit light S1 is a direction orthogonal to the X direction on a YZ plane including the Y direction. Note that, in the present specification, "rotation" means swinging motion that reciprocates around a rotation shaft.

Signal processing is executed based on a light receiving amount of reflected light S2, it is possible to acquire a plurality of sectional profiles of the workpiece W at different rotation angles. Data (height data) of a three-dimensional shape of the workpiece W can be generated based on the acquired sectional profile. Note that, since the slit light S1 rotates, the sectional profile is not necessarily parallel to an XZ plane.

As described above, the light projecting and receiving module 10 provided inside the optical displacement meter 1 is set to be rotatable, and thus, it is possible to acquire the plurality of sectional profiles of the workpiece W at the different rotation angles without conveying the workpiece W in the Y direction and without moving the optical displacement meter 1 in the Y direction with respect to the workpiece W. Accordingly, equipment such as a conveyor for conveying the workpiece W and a linear motion mechanism for moving the optical displacement meter 1 in the Y direction with respect to the workpiece W becomes unnecessary, and introduction of an inspection process using the optical displacement meter 1 becomes easy.

Note that, although the workpiece W may be set to be relatively movable with respect to the optical displacement meter 1, the plurality of sectional profiles can be acquired in a state where the workpiece W is stopped at the time of measurement. In addition, although the optical displacement meter 1 may be relatively movable with respect to the workpiece W, the plurality of sectional profiles can be acquired in a state where the optical displacement meter 1 is stopped at the time of measurement. The invention is not limited to a case where the optical displacement meter 1 is completely fixed, and may be movably supported with respect to the attachment member 5, or may be attached to a robot arm or the like and may be movable to an any measurement place.

Figure 2:
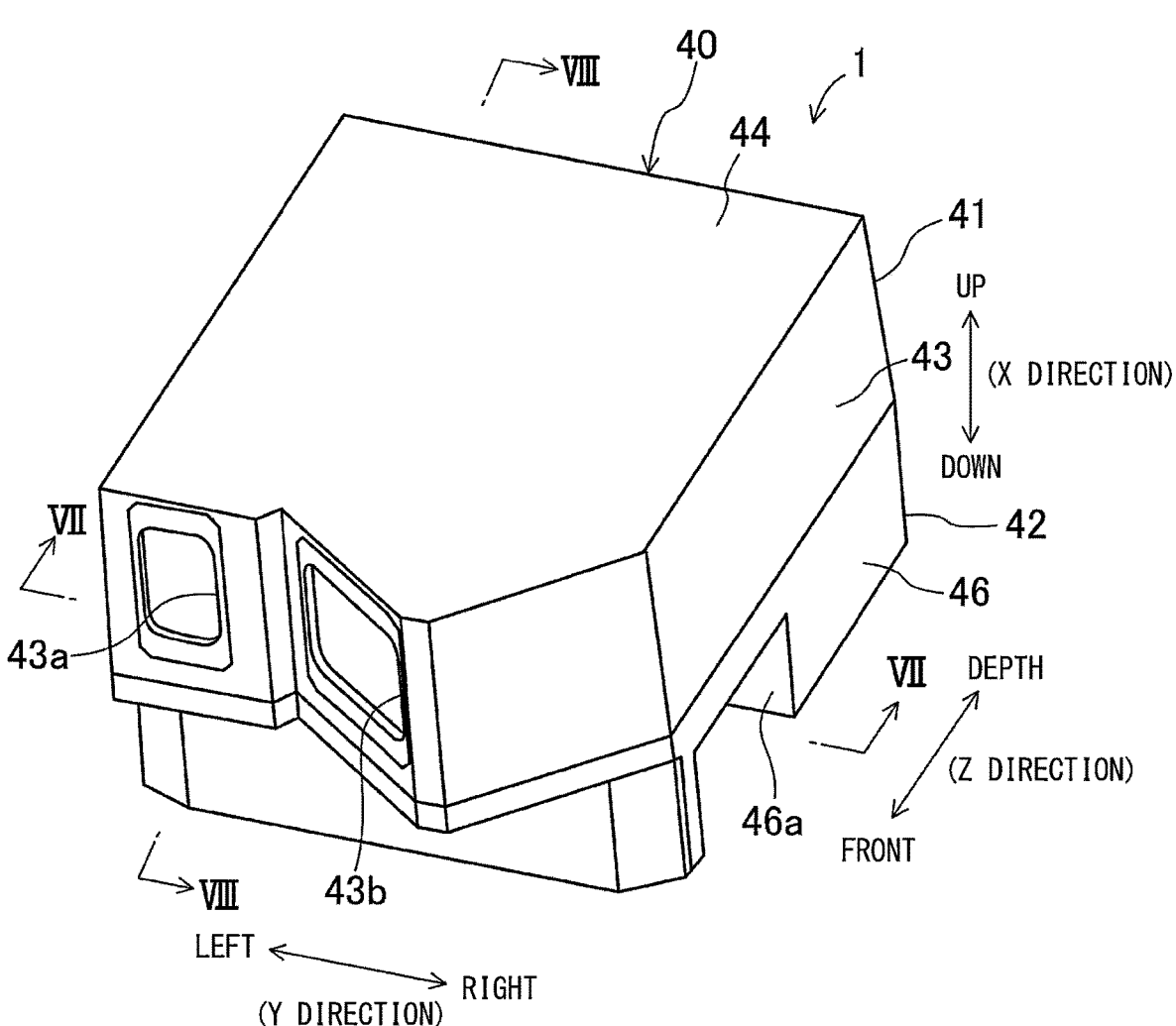
FIG. 2 is a perspective view of the optical displacement meter according to the first embodiment of the invention as viewed from above.
Figure 3:
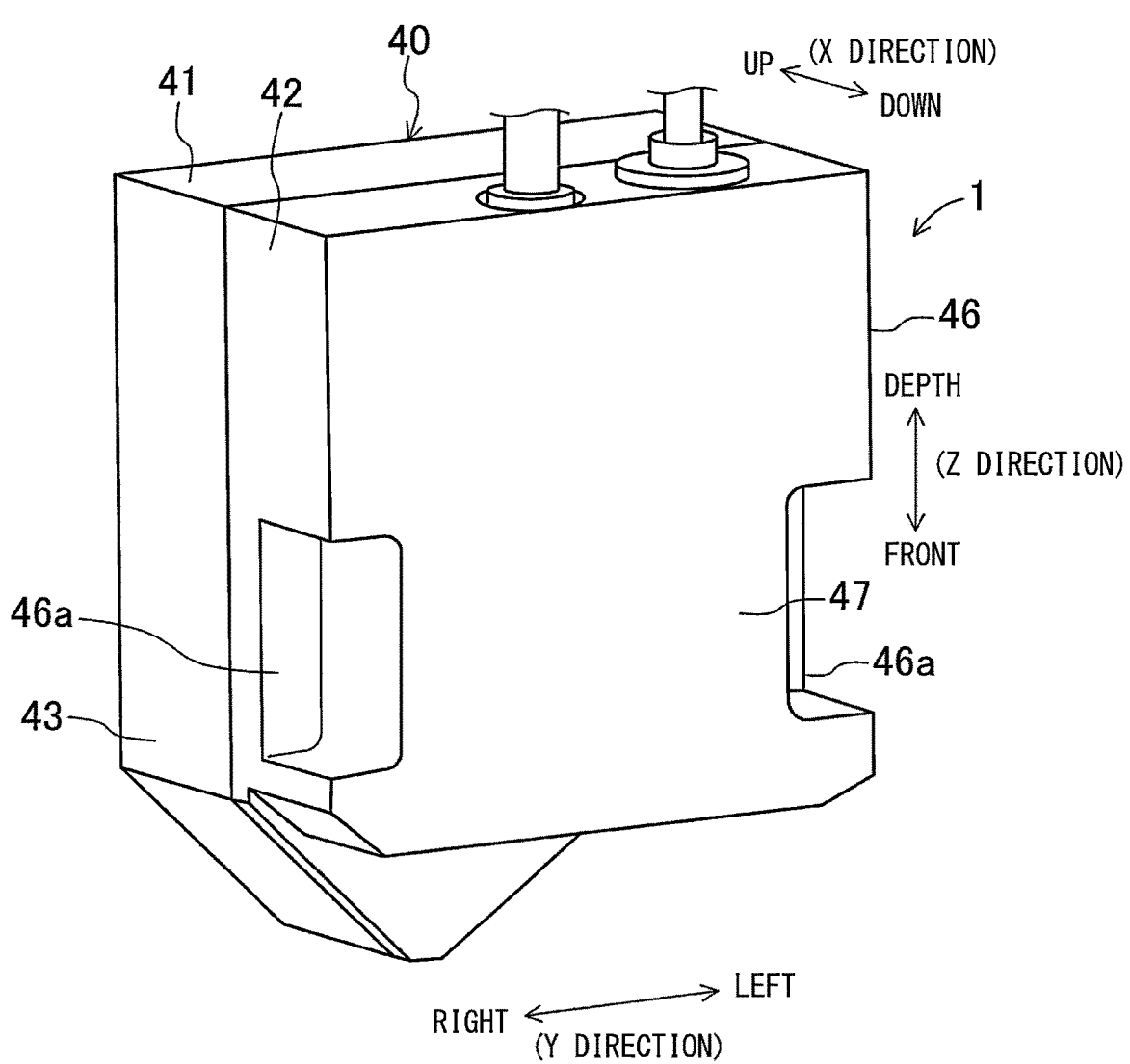
FIG. 3 is a perspective view of the optical displacement meter according to the first embodiment of the invention as viewed from below.

FIG. 2 is a perspective view of the optical displacement meter 1 according to the first embodiment of the invention as viewed from above, and FIG. 3 is a perspective view of the optical displacement meter 1 according to the first embodiment of the invention as viewed from below. As illustrated in each drawing, a left-right direction, a depth direction, and an up-down direction of the optical displacement meter 1 are defined, but are for the sake of convenience in description and do not limit a posture of the optical displacement meter 1 at the time of the operation. In the operation mode illustrated in FIG. 1, since the optical displacement meter 1 is installed above the workpiece W, the slit light S1 is emitted downward and the reflected light S2 travels upward. In this operation mode, the left-right direction of the optical displacement meter 1 corresponds to the Y direction of the workpiece W, the up-down direction of the optical displacement meter 1 corresponds to the X direction of the workpiece W, and the depth direction of the optical displacement meter 1 corresponds to the Z direction of the workpiece W. Note that, the optical displacement meter 1 may be installed such that the workpiece W is irradiated with the slit light S1 in a horizontal direction from the optical displacement meter 1, or the optical displacement meter 1 may be installed such that the workpiece W is irradiated with the slit light S1 downward from the optical displacement meter 1. A posture of the optical displacement meter 1 at the time of installation is not particularly limited.

Figure 4:
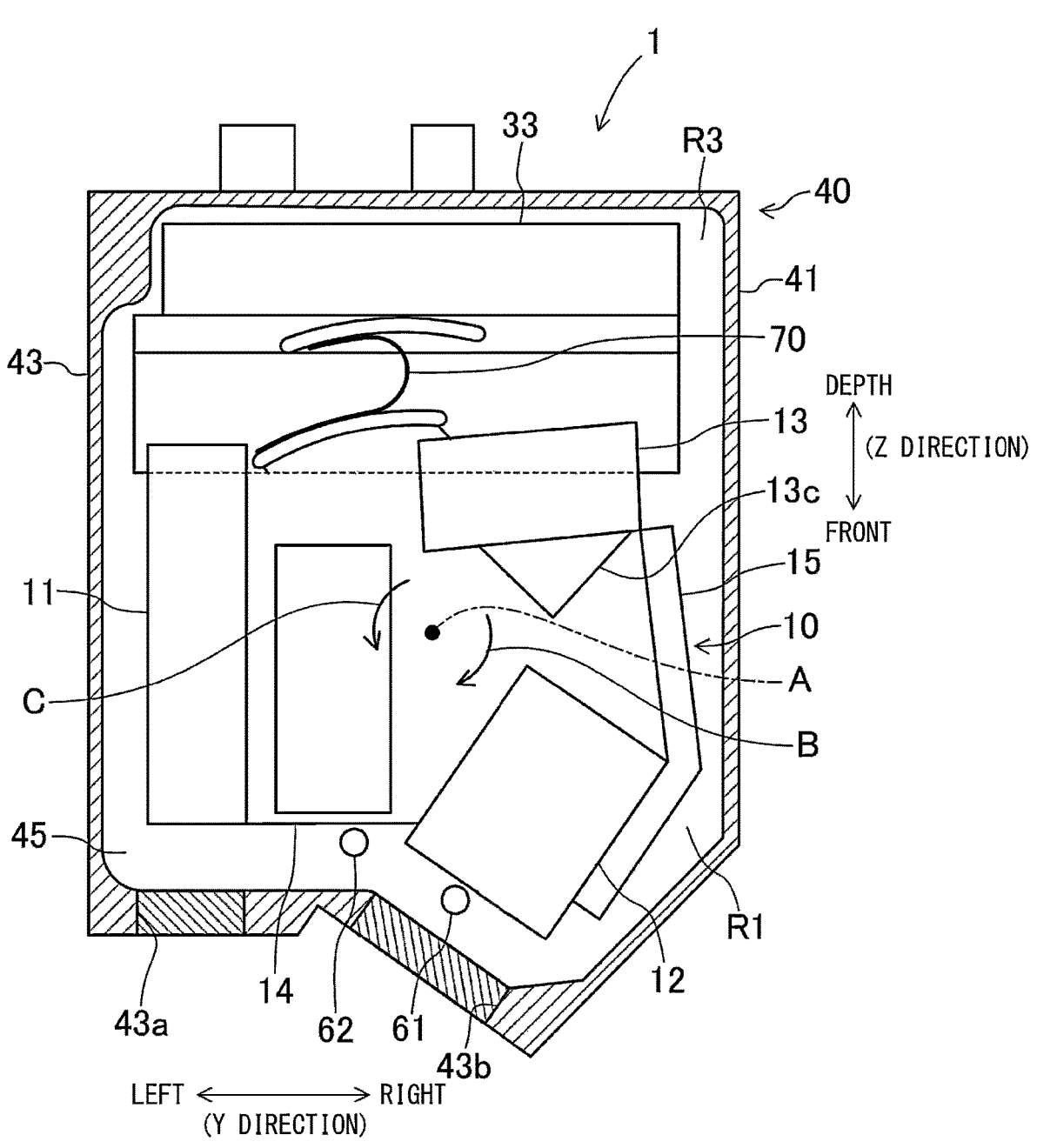
FIG. 4 is a plan view illustrating an inside of an upper space of the optical displacement meter according to the first embodiment of the invention.
Figure 5:
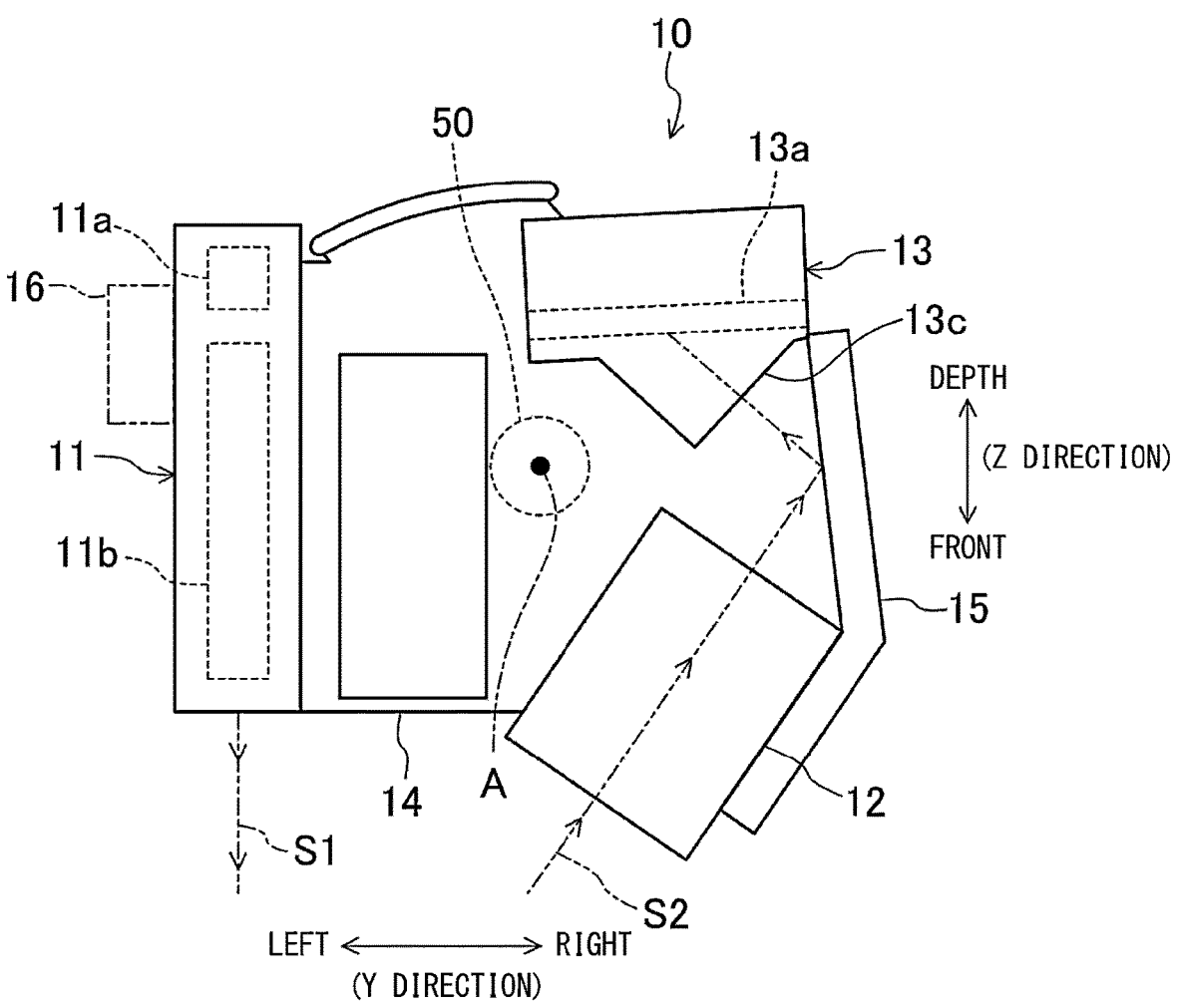
FIG. 5 is a plan view of a light projecting and receiving module of the optical displacement meter according to the first embodiment of the invention.
Figure 6:
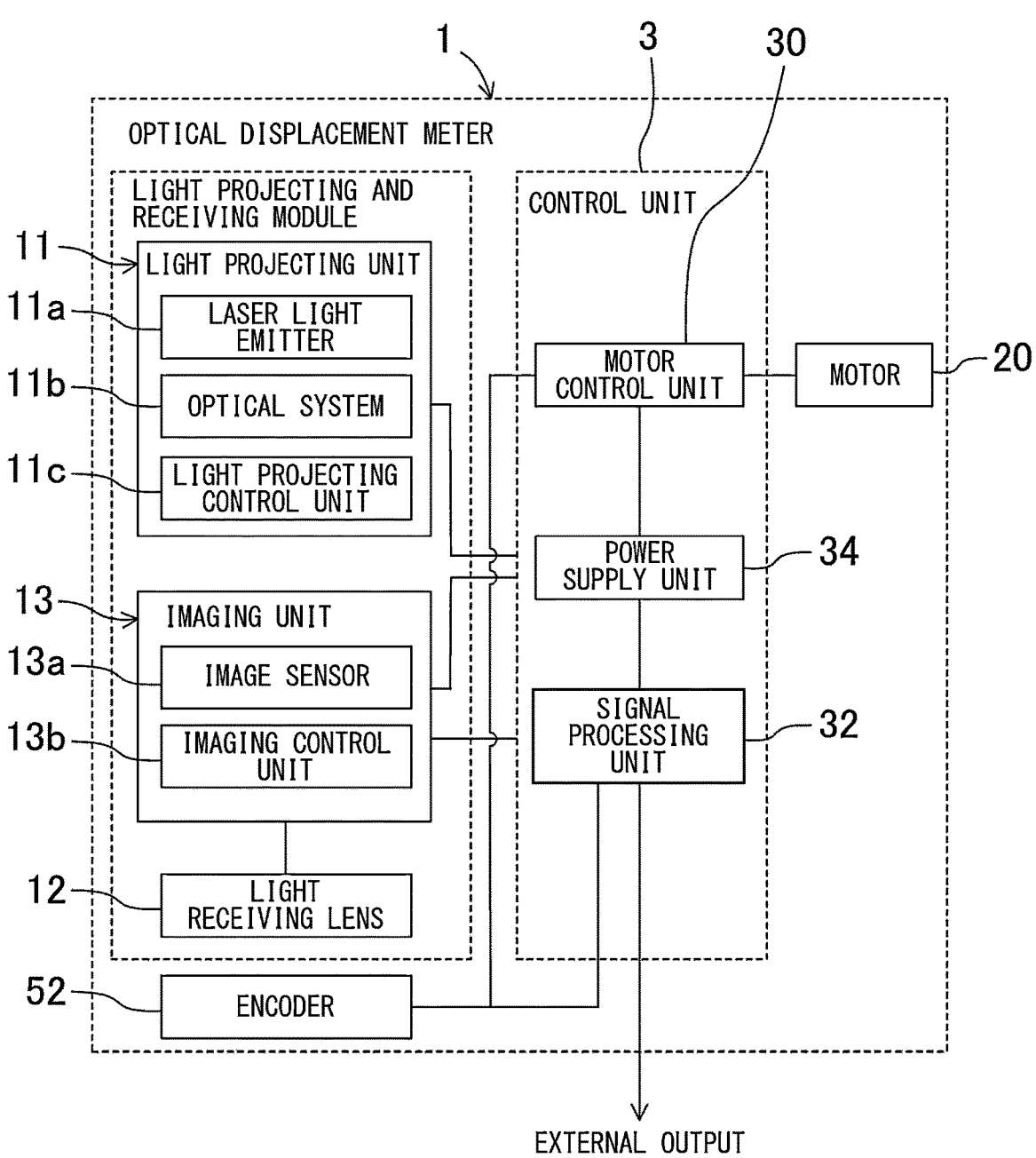
FIG. 6 is a block diagram illustrating a configuration of the optical displacement meter according to the first embodiment of the invention.

FIG. 4 is a diagram illustrating an internal structure of the optical displacement meter 1. The optical displacement meter 1 includes a light projecting and receiving module 10 (also illustrated in FIG. 5), a motor 20 (illustrated in FIG. 7) for rotating the light projecting and receiving module 10, a motor control unit 30 (illustrated in FIG. 8), and a housing 40. The light projecting and receiving module 10, the motor 20, and the motor control unit 30 are stored in the housing 40. As illustrated in FIG. 6, in the first embodiment, a control unit 3 includes the motor control unit 30, a power supply unit 34 (to be described later), and a signal processing unit 32 (to be described later). Note that, although the motor control unit 30 and the signal processing unit 32 are separately illustrated in FIG. 6 for the sake of convenience in description, the motor control unit 30 and the signal processing unit 32 may be integrated.

The light projecting and receiving module 10 includes a light projecting unit 11 that emits the slit light S1 extending in the X direction, a light collecting unit 12 having a light receiving lens that collects the reflected light S2 reflected by the workpiece W, an imaging unit 13 that receives the light collected by the light collecting unit 12, and a support member 14 that integrally holds the light projecting unit 11, the light collecting unit 12, and the imaging unit 13.

As illustrated in FIG. 6, the light projecting unit 11 includes a laser light emitter (light source) 11*a*, an optical system 11*b*, a light source housing that stores the laser light emitter 11*a* and the optical system 11*b*, and a light projection control unit 11*c* that controls the laser light emitter 11*a*. The laser light emitter 11*a* is controlled by the light projection control unit 11*c* to emit a predetermined light amount of laser light at a predetermined timing for a predetermined time. The light emitted from the laser light emitter 11*a* is incident on the optical system 11*b*. Although not illustrated, the optical system 11*b* includes a plurality of lenses including, for example, a cylindrical lens, and irradiates the workpiece W with the slit light S1 by spreading the incident laser light in a band shape. The light projecting unit 11 has a shape elongated in an irradiation direction of the slit light S1.

In order to improve the light receiving amount, the light collecting unit 12 is formed as a lens unit including a plurality of large-diameter light receiving lenses, and includes a light receiving lens and a lens housing that stores the light receiving lens. Since such a plurality of large-diameter lenses are included and a size of the light collecting unit is relatively large, a weight of the light collecting unit 12 is larger than a weight of the light projecting unit 11.

The imaging unit 13 includes, for example, an image sensor 13a such as a complementary MOS (CMOS) and an imaging control unit 13b. The image sensor 13a is controlled by the imaging control unit 13b and executes capturing at a predetermined timing. An exposure period at the time of capturing by the image sensor 13a can be controlled by the imaging control unit 13b.

Figure 7:
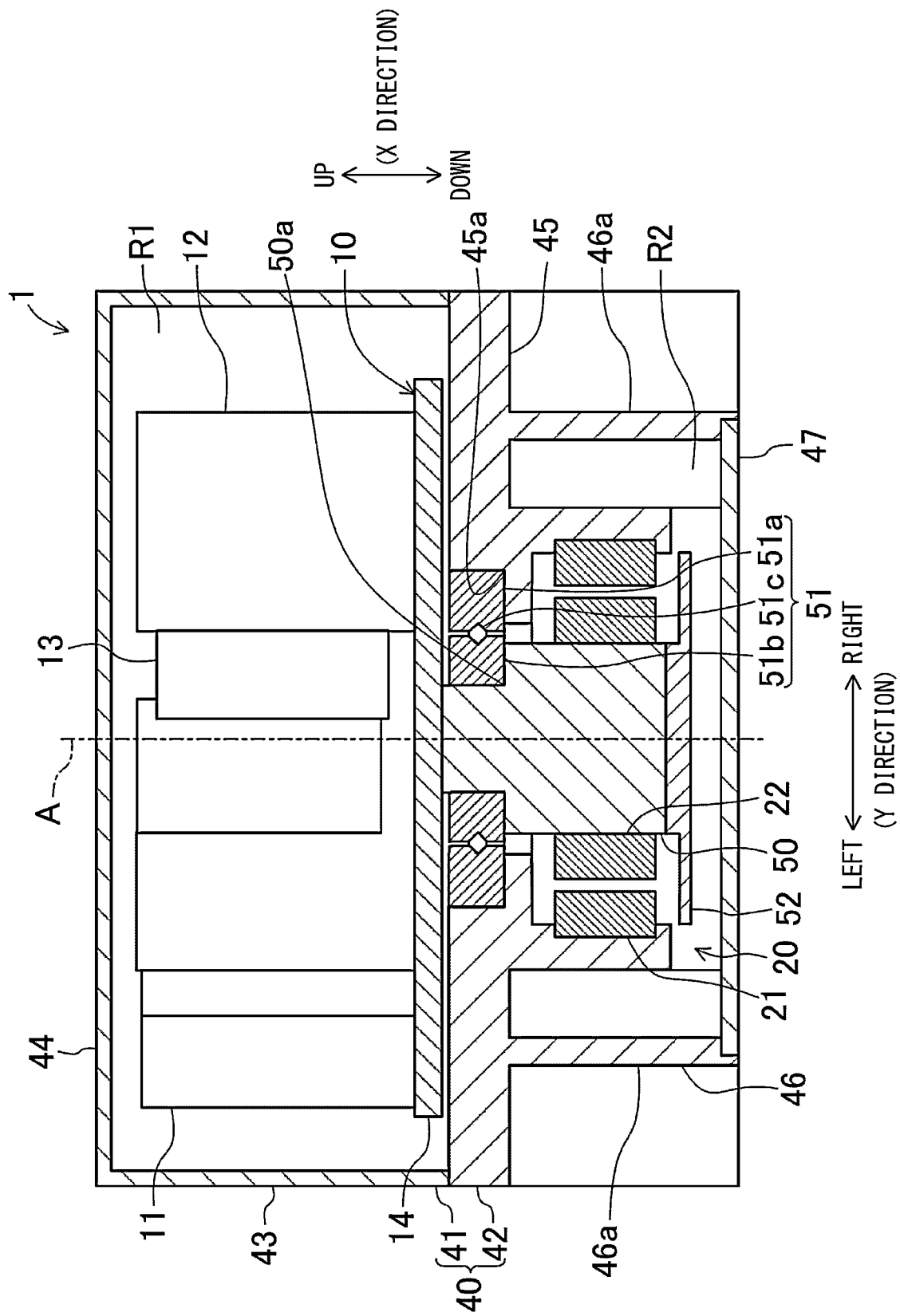
FIG. 7 is a sectional view taken along line VII-VII of FIG. 2.
Figure 8:
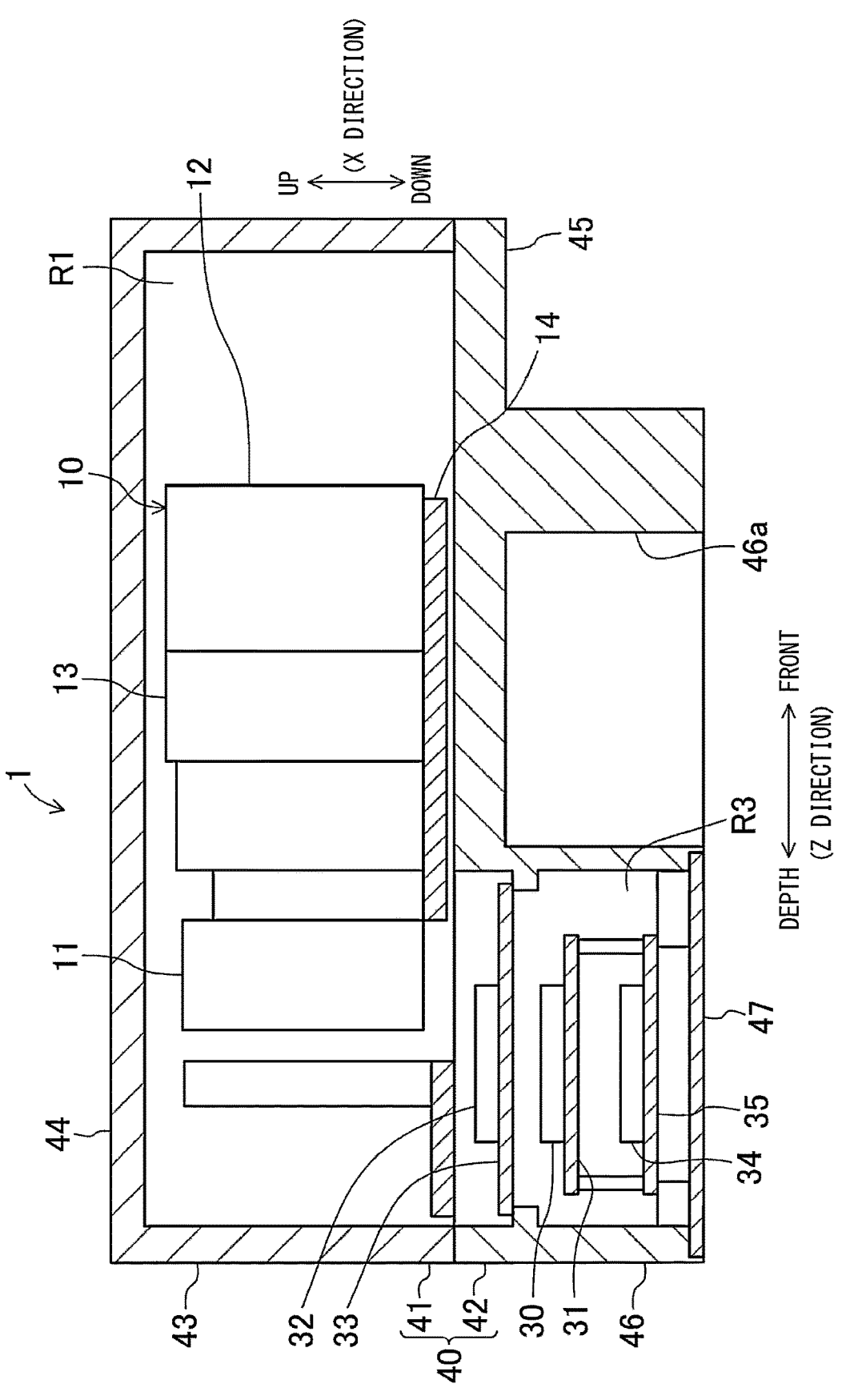
FIG. 8 is a sectional view taken along line VIII-VIII in FIG. 2.

As illustrated in FIGS. 7 and 8, the support member 14 is made of a flat plate-shaped high rigidity member, for example, a metal plate material. As illustrated in FIG. 7, the support member 14 is fixed to a rotation shaft 50 constituting a part of the optical displacement meter 1, and is supported by the housing 40 to be rotatable about a rotation center line A which is an axis of the rotation shaft 50. An extending direction of the support member 14 is a direction orthogonal to the rotation center line A.

The light projecting unit 11, the light collecting unit 12, and the imaging unit 13 are fixed to an upper surface of the support member 14. Specifically, in plan view of the light projecting and receiving module 10 illustrated in FIG. 5, the light projecting unit 11 is fixed to a left side portion of the support member 14 with respect to the rotation center line A, and the light collecting unit 12 and the imaging unit 13 are fixed to opposite sides thereof. As a result, the light projecting unit 11 and the light collecting unit 12 are provided at intervals in a radial direction (Y direction or Z direction) of the rotation shaft 50.

The light projecting unit 11 is disposed such that the irradiation direction of the slit light S1 is directed in the Z direction. The light collecting unit 12 is disposed such that an optical axis is along an incident direction of the reflected light S2 at a portion on a front side (workpiece W side) of the support member 14. Accordingly, although both the light projecting unit 11 and the light collecting unit 12 are directed in the Z direction, an optical axis of the optical system 11b of the light projecting unit 11 and an optical axis of the light collecting unit 12 (an optical axis of the light receiving lens) are in a relationship of intersecting each other at a location away from the light projecting and receiving module 10 in the Z direction. Since a distance in the left-right direction between the light projecting unit 11 and the light collecting unit 12 and the relationship between the optical axis of the optical system 11b of the light projecting unit 11 and the optical axis of the light collecting unit 12 can be changed in accordance with an installation distance of the optical displacement meter 1 with respect to the workpiece W, measurement accuracy, and the like, the illustrated example is merely an example.

The longer a distance between the light collecting unit 12 and the rotation shaft, the larger the moment of inertia of the light collecting unit 12 due to rotation. When a rotation direction of the light projecting and receiving module 10 is switched, it is necessary to temporarily stop the light projecting and receiving module 10. At this time, the larger the moment of inertia, the larger energy required to decelerate a rotational motion of the light projecting and receiving module 10. Thus, distance and time until the rotational motion stops are increased. Therefore, the light projecting and receiving module 10 further includes a light receiving side reflecting member 15 fixed to the support member 14. As a result, not only a size of the light projecting and receiving module 10 can be set to be compact, but also the moment of inertia due to rotation is reduced. Thus, a measurement interval is reduced. The light receiving side reflecting member 15 is made of, for example, a mirror, and the reflected light S2 emitted from the light collecting unit 12 is folded back toward the light projecting unit 11. Thus, a distance between the imaging unit 13 or the light collecting unit 12 and the rotation shaft 50 of the light projecting and receiving module 10 on the YZ plane is shortened. A folding direction may be, for example, a direction toward a center position of the housing 40 in the Y direction. The YZ plane is a plane including both a straight line extending in the Y direction and a straight line extending in the Z direction, and is a plane orthogonal to the X direction.

Specifically, the light receiving side reflecting member 15 is positioned at a right end portion of the support member 14 on a back side of the light collecting unit 12, is disposed on an optical path between the imaging unit 13 and the light collecting unit 12 on the YZ plane, and reflects the light collected by the light collecting unit 12 toward the imaging unit 13. In addition, the rotation shaft 50 of the light projecting and receiving module 10 is disposed between the light receiving side reflecting member 15 and the light projecting unit 11 on the YZ plane.

The light receiving side reflecting member 15 is disposed on the optical path between the imaging unit 13 and the light collecting unit 12, and thus, the light after being collected by the light collecting unit 12 may be reflected. As a result, an area of the light receiving side reflecting member 15 can be reduced. Note that, a position of the light receiving side reflecting member 15 may not be on the optical path between the imaging unit 13 and the light collecting unit 12, and the light collecting unit 12 may be disposed on an optical path between the light receiving side reflecting member 15 and the imaging unit 13 as in a first modification (illustrated in FIG. 17) to be described later.

The light receiving side reflecting member 15 protrudes upward from the upper surface of the support member 14. In addition, an extending direction of the light receiving side reflecting member 15 is the depth direction. An emission direction of the reflected light S2 incident on the light receiving side reflecting member 15 can be set by an installation angle of the light receiving side reflecting member 15, and the emission direction of the reflected light S2 is directed to a light receiving surface of the image sensor 13a.

A positional relationship between the image sensor 13a of the imaging unit 13 and the optical axis of the light collecting unit 12 is set to have a Scheimpflug relationship in which the light receiving surface of the image sensor 13a is inclined with respect to the optical axis of the light collecting unit 12. The optical system satisfying the Scheimpflug relationship can be referred to as a Scheimpflug optical system. In this embodiment, the light projecting unit 11, the light collecting unit 12, and the imaging unit 13 are integrally held by the support member 14 to have the Scheimpflug relationship, and thus, the light projecting and receiving module 10 is formed. With the Scheimpflug relationship, since the slit light is focused along a light projection axis of the light projecting unit 11, a profile image focused on the reflected light reflected by the workpiece W can be acquired. Thus, measurement accuracy of three-dimensional shape data of the workpiece W is improved, and as a result, a highly accurate profile can be acquired.

Even in a case where the light projecting and receiving module 10 is rotated about the rotation center line A, a relative positional relationship among the light projecting unit 11, the light collecting unit 12, the imaging unit 13, and the light receiving side reflecting member 15 does not change. Thus, the Scheimpflug relationship is maintained regardless of the rotation angle of the light projecting and receiving module 10.

The imaging unit 13 includes a cover glass 13c. The cover glass 13c is formed to cover the light receiving surface of the image sensor 13a, and is fixed to the image sensor 13a. The cover glass 13c is made of a light transmissive member having a property of transmitting the reflected light S2 emitted from the light receiving side reflecting member 15. The reflected light S2 transmitted through the cover glass 13c forms an image on the light receiving surface of the image sensor 13a.

The rotation shaft 50 of the light projecting and receiving module 10 is disposed to substantially coincide with a gravity center position of the light projecting and receiving module 10 on the YZ plane. That is, the light projecting and receiving module 10 includes, in addition to the support member 14, the light projecting unit 11, the light collecting unit 12, the imaging unit 13, and the light receiving side reflecting member 15, and when the gravity center position of the light projecting and receiving module 10 is measured or calculated in a state where the light projecting unit 11, the light collecting unit 12, the imaging unit 13, and the light receiving side reflecting member 15 are fixed to the support member 14, the gravity center position substantially coincides with the rotation center line A. In other words, positions of the rotation shaft 50 in the Y direction and the Z direction with respect to the support member 14 are set such that the gravity center position of the light projecting and receiving module 10 becomes a rotation center. The support member 14 is fixed to the rotation shaft 50 by a plurality of fastening members (not illustrated) or the like, and the support member 14 and the rotation shaft 50 do not rotate relative to each other.

The gravity center position of the light projecting and receiving module 10 substantially coincides with the rotation center line A, and thus, the moment of inertia due to the rotation of the light projecting and receiving module 10 is reduced. In addition, a load of the motor 20 caused by, for example, vibration is suppressed, and a decrease in rotation speed of the light projecting and receiving module 10 is also suppressed. The position of the gravity center of the light projecting and receiving module 10 and the rotation center line A may not exactly coincide with each other, and for example, a deviation amount of an allowable degree in terms of manufacturing tolerance does not cause a problem. In addition, even though the gravity center position of the light projecting and receiving module 10 and the rotation center line A slightly deviate from each other, it can be considered that the gravity center position thereof and the rotation center line substantially coincide with each other. For example, since the moment of inertia of the light projecting and receiving module 10 may be able to be sufficiently reduced, the load of the motor 20 caused by vibration or the like may be sufficiently suppressed, and the decrease in rotation speed of the light projecting and receiving module 10 can also be suppressed, when such an effect can be obtained, a slight deviation between the gravity center position of the light projecting and receiving module and the rotation center line A is allowed, and it can be said that the gravity center position of the light projecting and receiving module 10 and the rotation center line A substantially coincide with each other.

As described above, since a diameter of the light collecting unit 12 is increased, a weight is increased. Thus, in some cases, it is conceivable that the gravity center position of the light projecting and receiving module 10 is too close to the light collecting unit 12 and it becomes difficult to design. In such a case, as illustrated by virtual lines only in FIG. 5, a weight unit 16 can be provided on the light projecting unit 11 side in the light projecting and receiving module 10. As a result, the gravity center position of the light projecting and receiving module 10 can be positioned at an intermediate portion between the light projecting unit 11 and the light collecting unit 12. The weight unit 16 is disposed on a side opposite to the light collecting unit 12 across the rotation center line A. The weight unit 16 may be fixed to the support member 14 or may be fixed to the light projecting unit 11. The number of weight units 16 is not limited to one, and may be plural.

The closer the rotation shaft of the light projecting and receiving module 10 and the gravity center position are, the more stable the rotation is and a load on the rotation shaft 50 can be suppressed. However, it is assumed that a heaviness of the light projecting unit 11 is different from a heaviness of the light collecting unit 12. With this configuration, since the weight unit is provided at a position closer to the light projecting unit 11 than the light collecting unit 12 in the light projecting and receiving module 10 to suppress the deviation between the gravity center position of the light projecting and receiving module 10 and the rotation shaft 50 due to the difference in heaviness, it is possible to stabilize the rotation and it is possible to suppress the load on the rotation shaft 50.

Without providing the weight unit 16, a material of the light source housing of the light projecting unit 11 may be a material having a higher density than a material of the lens housing of the light collecting unit 12. For example, the support member 14 or the lens housing having a large volume can be made of a relatively low density material such as aluminum, and the light source housing can be made of a relatively high density material such as zinc or stainless steel (SUS). As a result, since the light projecting unit 11 can be set to be heavy, the gravity center position of the light projecting and receiving module 10 can be positioned at the intermediate portion between the light projecting unit 11 and the light collecting unit 12. Note that, a material of a housing of the light projecting unit 11 may be a material having a higher density than a material of a housing of the light collecting unit 12, and the weight unit 16 may be provided on the light projecting unit 11 side in the light projecting and receiving module 10.

As illustrated in FIG. 7, the housing 40 is a member for storing the light projecting and receiving module 10, the motor 20, and the motor control unit 30, and has a two-stage structure. That is, the housing 40 has an upper housing constituent unit 41 constituting an upper portion and a lower housing constituent unit 42 constituting a lower portion. In addition, the two-stage structure can also be referred to as a two-layer structure, and in this case, the upper housing constituent unit 41 is a first layer and the lower housing constituent unit 42 is a second layer.

The upper housing constituent unit 41 and the lower housing constituent unit 42 may be integrated or may be formed as separate members. In the present embodiment, a case where the upper housing constituent unit 41 and the lower housing constituent unit 42 are formed as separate members will be described. In this case, the housing 40 can be formed by coupling the upper housing constituent unit 41 and the lower housing constituent unit 42 by using, for example, a fastening member (not illustrated) or the like.

As illustrated in FIG. 7, the upper housing constituent unit 41 includes an upper peripheral wall 43 and an upper wall 44. The upper wall 44 extends along the YZ plane. The upper peripheral wall 43 extends from a peripheral edge portion of the upper wall 44 toward the lower housing constituent unit 42. A space formed inside the upper housing constituent unit 41 is an upper space R1. The upper space R1 is closed by the lower housing constituent unit 42, and the upper space R1 is sealed.

As illustrated in FIGS. 2 and 4, a light projecting window 43*a* and a light receiving window 43*b* are provided in a front portion of the upper peripheral wall 43. The light projecting window 43*a* and the light receiving window 43*b* are made of a member having optical transparency. As illustrated in FIG. 4, the light projecting window 43*a* is disposed to face a surface of the light projecting unit 11 irradiated with the slit light S1. Even though the light projecting and receiving module 10 rotates, a size and a position of the light projecting window 43*a* are set such that the slit light S1 can be emitted from the light projecting window 43*a* as long as the rotation angle of the light projecting and receiving module 10 is within a predetermined angle range to be described later.

In addition, the light receiving window 43*b* is disposed to face a light incident surface of the light collecting unit 12. Even though the light projecting and receiving module 10 rotates, a size and a position of the light receiving window 43*b* are set such that the reflected light S2 can be incident on the light collecting unit 12 from the light receiving window 43*b* as long as the rotation angle of the light projecting and receiving module 10 is within a predetermined angle range to be described later.

As illustrated in FIG. 7, the lower housing constituent unit 42 includes a board portion 45, a lower peripheral wall 46 extending downward from the board portion 45, and a lid member 47. The board portion 45 is a portion that extends along the YZ plane and closes a lower open portion of the upper housing constituent unit 41. The lid member 47 is attached to a lower end portion of the lower peripheral wall 46. A space formed inside the lower housing constituent unit 42 is a lower space R2. The lower space R2 is sealed by the lid member 47. In short, the housing 40 has a structure for sealing the inside. The sealing structure is a structure that prevents external dust and dirt from entering the inside of the housing 40, and can be referred to as, for example, a dustproof structure. Note that, the housing 40 may not be completely sealed, and for example, there may be a gap through which air can slightly enter and exit.

As illustrated in FIG. 3, recesses 46*a* are formed on left and right sides of the lower peripheral wall 46 of the lower housing constituent unit 42. The recesses 46*a* can be used as, for example, portions to be gripped by an operator with fingers at the time of installing the optical displacement meter 1. Note that, the recesses 46*a* may be provided as necessary.

As illustrated in FIG. 7, the motor 20 for integrally rotating the light projecting and receiving module 10 is stored in the lower space R2. A central axis of the motor 20 stored in the lower space R2 coincides with the axis of the rotation shaft 50, and extends in the up-down direction. On the other hand, the light projecting and receiving module 10 is stored in the upper space R1. Since the upper space R1 and the lower space R2 are aligned in a central axis direction of the motor 20, the light projecting and receiving module 10 stored in the upper space R1 is disposed in the central axis direction of the motor 20 with respect to the motor 20 stored in the lower space R2. In other words, the optical displacement meter 1 has a multi-stage structure in which the light projecting and receiving module 10 is disposed in an upper stage and the motor 20 is disposed in a lower stage.

Since the light projecting and receiving module 10 is disposed to be aligned in the central axis direction with respect to the motor 20, it is less likely to be influenced by the motor 20 when a positional relationship between the light projecting unit 11 and the light collecting unit 12 of the light projecting and receiving module 10 is set. Accordingly, for example, as in a case where the installation distance is relatively short, it is also possible to design in consideration of the fact that an interval between the light projecting unit 11 and the light collecting unit 12 cannot be set to be large.

The optical displacement meter 1 further includes a bearing 51 for rotatably supporting the rotation shaft 50 of the light projecting and receiving module 10. Since the light projecting and receiving module 10 increases in weight as described above, for example, when the optical displacement meter 1 is used in the posture illustrated in FIG. 1, a moment load is generated on the rotation shaft 50 due to the weight of the light projecting and receiving module 10. Specifically, the moment load in a direction in which the axis is inclined with respect to a horizontal plane acts on the rotation shaft 50 due to a difference between a portion of the rotation shaft 50 supported by the bearing 51 and the gravity center position of the light projecting and receiving module 10. In particular, in the case of the two-stage structure described above, since the upper housing constituent unit 41 and the lower housing constituent unit 42 are aligned in the direction of the central axis of the motor (the rotation shaft of the light projecting and receiving module), the difference between the portion of the rotation shaft 50 supported by the bearing 51 and the gravity center position of the light projecting and receiving module 10 tends to be relatively large. On the other hand, the bearing 51 of the present embodiment is configured to be able to support the moment load generated by the difference between the portion of the rotation shaft 50 supported by the bearing 51 and the gravity center position of the light projecting and receiving module 10.

For example, a cross roller bearing in which a plurality of rollers 51*c* are arrayed between an annular outer ring member 51*a* and an annular inner ring member 51*b* and axes of the rollers 51*c* adjacent in a circumferential direction are orthogonal to each other can be used as the bearing 51 capable of supporting the moment load. That is, a step portion 45*a* into which the outer ring member 51*a* is fitted is formed in an annular shape on the board portion 45 of the lower housing constituent unit 42. The outer ring member 51*a* is fixed to the board portion 45 in a state of being fitted in the step portion 45*a*. On the other hand, a fitting portion 50*a* to which the inner ring member 51*b* is fitted is formed in an upper portion of the rotation shaft 50. The inner ring member 51*b* is fixed in a state of being fitted to the fitting portion 50*a*. Note that, the inner ring member 51*b* may be fixed to the support member 14 of the light projecting and receiving module 10.

The cross roller bearing is used as the bearing 51, and thus, the roller 51*c* comes into line contact with the outer ring member 51*a* and the inner ring member 51*b*. As a result, rigidity is greatly improved as compared with a ball type bearing. Thus, not only a load in a radial direction (radial load) of the rotation shaft 50 but also a load in an axial direction (thrust load) can be received while a bearing structure is thin in the axial direction and compact, and rigidity against the moment load can be improved. Thus, smooth rotation can be realized regardless of the posture of the optical displacement meter 1 at the time of the operation.

The bearing 51 may be incorporated in the motor 20. In addition, the bearing 51 may be a bearing other than the cross roller bearing. In a case where the bearing other than the cross roller bearing is used, for example, two or more ball bearings are disposed at intervals in the axial direction of the rotation shaft 50. As a result, a bearing structure capable of supporting the moment load is obtained. In a case where two or more ball bearings are used, one ball bearing can be held on the board portion 45 of the lower housing constituent unit 42, and the other ball bearing can be incorporated in the motor 20.

The optical displacement meter 1 further includes an encoder (rotation angle acquisition unit) 52 for acquiring a rotation angle of the rotation shaft 50, that is, the rotation angle of the light projecting and receiving module 10. The encoder 52 is an optical encoder. Although not illustrated, an optical encoder is known in the related art, and includes, for example, a rotating plate that is fixed to a lower end portion of the rotation shaft 50 and rotates together with the rotation shaft 50, and a fixing plate fixed to the housing 40. The optical encoder is configured to receive light emitted from a light emitter by a light receiver through slits formed at equal intervals in the rotating plate and the fixing plate, and convert the light receiving amount into an electric signal to generate and output a pulse.

The encoder 52 is the optical encoder, and thus, detection accuracy of the rotation angle is improved as compared with a magnetic encoder, but the encoder is weak against dust or the like. On the other hand, the encoder 52 is stored inside the housing 40, specifically, in the sealed lower space R2 as described above, and thus, dust or the like is prevented from adhering to the encoder 52. For example, even in a case where dust or dirt enters the housing 40 when a position and a posture of the imaging unit 13 are adjusted in the upper space R1 in which the light projecting and receiving module 10 is stored, the space in which the encoder 52 is stored is sealed to prevent dust or dirt from entering the lower space R2 in which the encoder 52 is stored from the upper space R1 in which the light projecting and receiving module 10 is stored and rotated. Thus, it is easy to use an optical encoder that has high accuracy but is easily influenced by dirt and dust, and highly accurate measurement can be performed.

The motor 20 is a direct drive motor that directly drives the light projecting and receiving module 10. The direct drive is a drive mode in which a speed reduction mechanism is not interposed between the motor 20 and a driven body. Note that, although will be described later, the invention is not limited to the direct drive motor.

The motor 20 includes a stator 21 including a coil and a rotor 22 including a permanent magnet. The rotor 22 is fixed between the bearing 51 and the encoder 52 with respect to an outer peripheral portion of the rotation shaft 50. The stator 21 is fixed to the lower housing constituent unit 42 and is disposed to surround the rotor 22.

The motor control unit 30 includes, for example, a microcomputer, a ROM, a RAM, and the like, and operates according to a predetermined program. Specifically, the motor control unit 30 can set the rotation speed of the motor 20 to a desired speed and set the rotation angle of the motor 20 to a desired angle by controlling a current flowing through the stator 21. The encoder 52 is connected to the motor control unit 30. The motor control unit 30 can calculate a current rotation angle of the light projecting and receiving module 10 based on a pulse signal output from the encoder 52.

When a scanning start position, a scanning end position, a scanning range, and the like of the slit light S1 with respect to the workpiece W are set by the inspection setting, a rotation start position, a rotation end position, a rotation angle, and the like of the light projecting and receiving module 10 corresponding to the set scanning start position, scanning end position, and scanning range can be calculated.

The motor control unit 30 controls the motor 20 based on the calculation result, and rotates the light projecting and receiving module 10 in a state where the Scheimpflug relationship is maintained inside the housing 40 to scan the slit light S1 in the direction orthogonal to the X direction.

Since the light projecting and receiving module 10 is stored in the upper space R1 of the housing 40, a part of the light projecting and receiving module 10 may come into contact with an inner wall of the housing 40 depending on the rotation angle of the light projecting and receiving module 10. On the other hand, in the present embodiment, a rotation angle range of the light projecting and receiving module 10 that rotates at the time of the operation of the optical displacement meter 1, that is, at the time of measurement is set to a predetermined angle range that avoids the light projecting and receiving module 10 from coming into contact with the inner wall of the housing 40. That is, in a case where it is assumed that the light projecting and receiving module 10 rotates to a first rotation angle, the light projecting and receiving module 10 has a dimension coming into contact with the inner wall of the housing 40 on the YZ plane orthogonal to the X direction, but the rotation angle range of the light projecting and receiving module 10 that rotates at the time of measurement is set to a predetermined angle range smaller than the first rotation angle in order to avoid the contact of the light projecting and receiving module 10 with the inner wall of the housing 40. With this configuration, since the housing 40 may be designed based on an angle range in which the light projecting and receiving module 10 needs to be rotated, the housing 40 can be easily downsized.

Examples of a method for setting the rotation angle range of the light projecting and receiving module 10 to a predetermined angle range include a method for mechanically realizing the rotation angle range and a method for realizing the rotation angle range by software. In the present embodiment, as the method for mechanically realizing the rotation angle range, as illustrated in FIG. 4, a first stopper 61 and a second stopper 62, which are examples of mechanical parts, are provided inside the housing 40. In this example, the first stopper 61 and the second stopper 62 are provided to protrude upward from the board portion 45. When the light projecting and receiving module 10 rotates in a direction of an arrow B about the rotation center line A, the light projecting and receiving module 10 abuts on the first stopper 61 before a part of the light projecting and receiving module 10 abuts on the inner wall of the housing 40, and the light projecting and receiving module 10 is prevented from further rotating in the direction of the arrow B. In addition, when the light projecting and receiving module 10 rotates in a direction of an arrow C about the rotation center line A, the light projecting and receiving module 10 abuts on the second stopper 62 before a part of the light projecting and receiving module 10 abuts on the inner wall of the housing 40, and the light projecting and receiving module 10 is prevented from further rotating in the direction of the arrow C. That is, the first stopper 61 and the second stopper 62 that prevent the light projecting and receiving module 10 from rotating to an outside of the predetermined angle range at the time of measurement are provided inside the housing 40.

The first stopper 61 and the second stopper 62 may be made of an elastic member such as rubber or thermoplastic elastomer. In addition, the first stopper 61 and the second stopper 62 may be made of metal, and an elastic member may be provided at a portion of the support member 14 where the first stopper 61 and the second stopper 62 abut. As a result, it is possible to reduce sound generated when the light projecting and receiving module 10 abuts on the first stopper 61 and the second stopper 62.

In addition, the support member 14 preferably abuts on the first stopper 61 and the second stopper 62. This is because when the light projecting unit 11, the light collecting unit 12, and the like abut on the first stopper 61 and the second stopper 62, the optical axis may be deviated due to an impact at the time of contact. In addition, the first stopper 61 and the second stopper 62 may be provided on the upper peripheral wall 43. Further, only one of the first stopper 61 and the second stopper 62 may be provided.

Next, a method by software will be described. That is, the motor control unit 30 executes the contact avoidance control, and thus, it is also possible to avoid the light projecting and receiving module 10 from coming into contact with the inner wall of the housing 40. The motor control unit 30 controls the motor 20 to rotate the light projecting and receiving module 10 within a predetermined angle range at the time of measurement based on the rotation angle acquired by calculating the pulse signal output from the encoder 52. This control is contact avoidance control. The contact avoidance control is executed, and thus, the light projecting and receiving module 10 can be avoided from coming into contact with the inner wall of the housing 40 without providing the stoppers 61 and 62. Note that, the stoppers 61 and 62 may also be provided in a case where the contact avoidance control is executed.

The light projecting and receiving module 10 may not come into contact with the inner wall of the housing 40 at the time of measurement. For example, since the light projecting and receiving module 10 may come into contact with the inner wall of the housing 40 at the time of non-measurement such as at the time of maintenance or various settings, the motor control unit 30 can be configured to execute the contact avoidance control only at the time of measurement.

As illustrated in FIG. 8, a board storing space R3 is provided in the lower housing constituent unit 42. In plan view illustrated in FIG. 4, the board storing space R3 is displaced from a center of the housing 40 toward a back side, and is accordingly positioned on a back side of the motor 20 (illustrated in FIG. 7). In addition, since the board storing space R3 is positioned below the upper space R1 in which the light projecting and receiving module 10 is stored, the board storing space R3 is a space different from the upper space R1. The board storing space R3 is disposed at a position different from the upper space R1 with respect to a rotation shaft direction of the light projecting and receiving module 10, and is disposed at the same position as the lower space R2 in which the motor 20 is stored. As viewed along the rotation shaft of the light projecting and receiving module 10, the upper space R1 and the lower space R2 are disposed at positions overlapping with the rotation shaft, while the board storing space R3 is disposed at positions not overlapping with the rotation shaft. For example, in a case where the size of the light projecting and receiving module 10 is larger than a size of the motor 20, an outer shape of the housing 40 can be set to be more compact by adopting the two-stage structure in which the upper space R1 for storing the light projecting and receiving module 10 is a first stage, and the lower space R2 for storing the motor 20 and the board storing space R3 for storing the control unit 30 are second stages.

As illustrated in FIG. 8, the board storing space R3 stores a motor control board 31 on which the motor control unit 30 is implemented, a signal processing board 33 on which the signal processing unit 32 is implemented, and a power supply board 35 on which the power supply unit 34 is implemented. On the motor control board 31 and the signal processing board 33, a processor such as a central processing unit (CPU), a digital signal processor (DSP), or a field programmable gate array (FPGA) that functions as the motor control unit 30 and the signal processing unit 32, and a storage element (not illustrated) such as a random access memory (RAM) or a read-only memory (ROM) for storing a program executed by the processor are mounted. Each of the boards 31, 33, and 35 is fixed to the lower housing constituent unit 42. Since the motor control unit 30 and the signal processing unit 32 are stored in the board storing space R3 different from the upper space R1, it is possible to thermally separate the light projecting unit 11 that particularly easily generates heat from the motor control unit 30 and the signal processing unit 32, and it is possible to stabilize the operations of the motor control unit 30 and the signal processing unit 32. Note that, the disposition of the control unit 3 is not limited to the above example, and for example, the signal processing unit 32 may be stored within the housing 40 while the motor control unit 30 may be disposed outside the housing 40.

Since the reflected light S2 is incident from the front side of the housing 40, the motor control unit 30, the signal processing unit 32, and the power supply unit 34 stored on the back side of the housing 40 are disposed on the side opposite to the light projecting and receiving module 10 from the side on which the reflected light S2 is incident. As a result, the motor control unit 30, the signal processing unit 32, and the power supply unit 34 can be prevented from interfering with displacement measurement. In addition, with the Z direction as a reference, the motor control unit 30, the signal processing unit 32, and the power supply unit 34 are disposed adjacent to the light projecting and receiving module 10 in the Z direction. In addition, since the board storing space R3 is sealed by the lid member 47, it is possible to suppress dust and the like from adhering to each of the boards 31, 33, and 35.

The signal processing board 33 is positioned at the top, the motor control board 31 is positioned below the signal processing board 33, and the power supply board 35 is positioned below the motor control board 31. The signal processing board 33 positioned at the top comes closest to the light projecting and receiving module 10, and the signal processing board 33 is positioned below the support member 14 of the light projecting and receiving module 10. As a result, the light projecting and receiving module 10 does not come into contact with the signal processing board 33 when rotating in the predetermined angle range. That is, all of the motor control unit 30, the signal processing unit 32, and the power supply unit 34 are disposed to avoid contact with the light projecting and receiving module 10 that rotates at the time of measurement.

The power supply unit 34 is a unit that supplies power to the light projecting unit 11, the imaging unit 13, the motor control unit 30, the signal processing unit 32, and the like. In the present embodiment, although the power supply unit 34, the motor control unit 30, and the signal processing unit 32 are implemented on different boards, the invention is not limited thereto, and any two or more thereof may be integrated and implemented on one board.

The signal processing unit 32 includes, for example, a microcomputer, a ROM, a RAM, and the like, and is a unit that operates in accordance with a predetermined program and generates sectional profile data of the workpiece W based on the light receiving amount of the imaging unit 13. The boards 31, 33, and 35, the light projecting unit 11, and the imaging unit 13 are connected by a wiring indicated by reference numeral 70 in FIG. 4. The wiring 70 has flexibility and is configured not to influence a rotation operation of the light projecting and receiving module 10.

Figure 9:
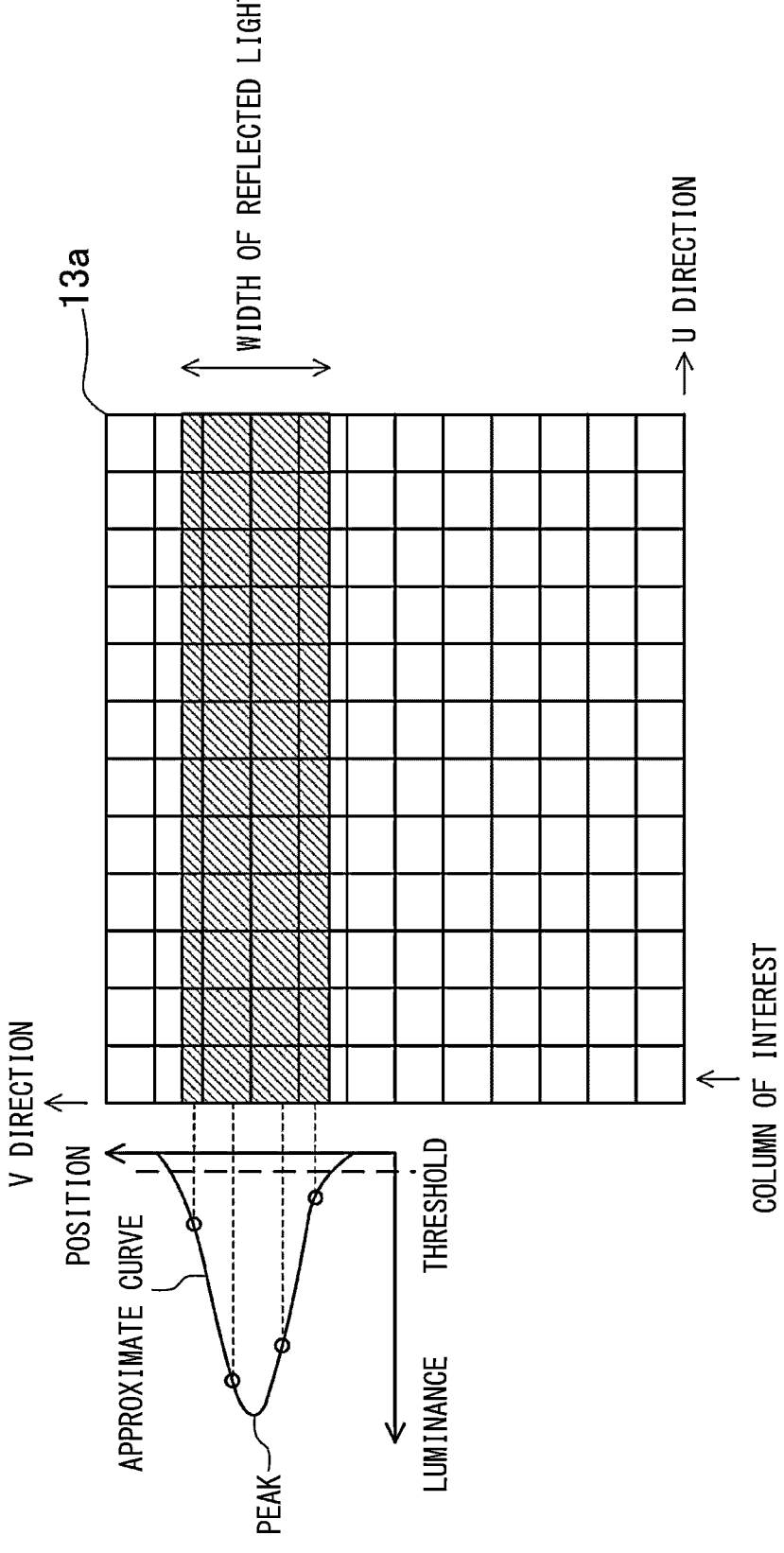
FIG. 9 is a diagram for explaining a method of displacement measurement.

As illustrated in FIG. 9, the image sensor 13a of the imaging unit 13 has a plurality of pixels two-dimensionally arrayed in a U direction corresponding to the X direction and a V direction orthogonal to the U direction. The signal processing unit 32 acquires a luminance value (light receiving amount) of each pixel included in the image sensor 13a, and obtains an approximate curve of a luminance value change. The signal processing unit 32 calculates a peak position in the V direction of each pixel column in the obtained approximate curve, and acquires the calculated peak position as the displacement of the workpiece W.

The signal processing unit 32 executes the calculation of the peak position described above multiple times during the rotation operation of the light projecting and receiving module 10. The signal processing unit 32 associates the obtained peak position with the rotation angle of the light projecting and receiving module 10 when the peak position is obtained, and stores the peak position and the rotation angle thereof as measurement data. Since the rotation angle and UV coordinates of the light projecting and receiving module 10 correspond to XYZ coordinates of the workpiece, the sectional profile data of the workpiece W at a desired rotation angle can be generated based on the measurement data. In addition, a plurality of sectional profiles of the workpiece W are acquired at different rotation angles, and thus, the signal processing unit 32 can generate the data of the three-dimensional shape of the workpiece W.

That is, the control unit 3 including the motor control unit 30 and the signal processing unit 32 can control the motor 20, and can rotate the light projecting and receiving module 10 to scan the slit light S1 in the direction orthogonal to the X direction. The control unit 3 can control the light projecting unit 11 and the imaging unit 13 to generate the sectional profile at each of different rotation angles of the light projecting and receiving module 10. When the light projecting unit 11 and the imaging unit 13 are controlled, the control unit 3 transmits an exposure trigger for driving the light projecting unit 11 and the imaging unit 13 to the light projecting unit 11 and the imaging unit 13. The light projecting unit 11 and the imaging unit 13 that have received the exposure trigger are configured to execute capturing. A transmission timing of the exposure trigger can be set based on a rotation angle θ acquired by the encoder 52, and the control unit 3 transmits the exposure trigger at a specific rotation angle. As another method, in a case where the transmission timing of the exposure trigger is set in advance, the encoder 52 acquires the rotation angle θ of a timing at which the exposure trigger is transmitted.

(Correction Processing by Control Unit)

Figure 10:
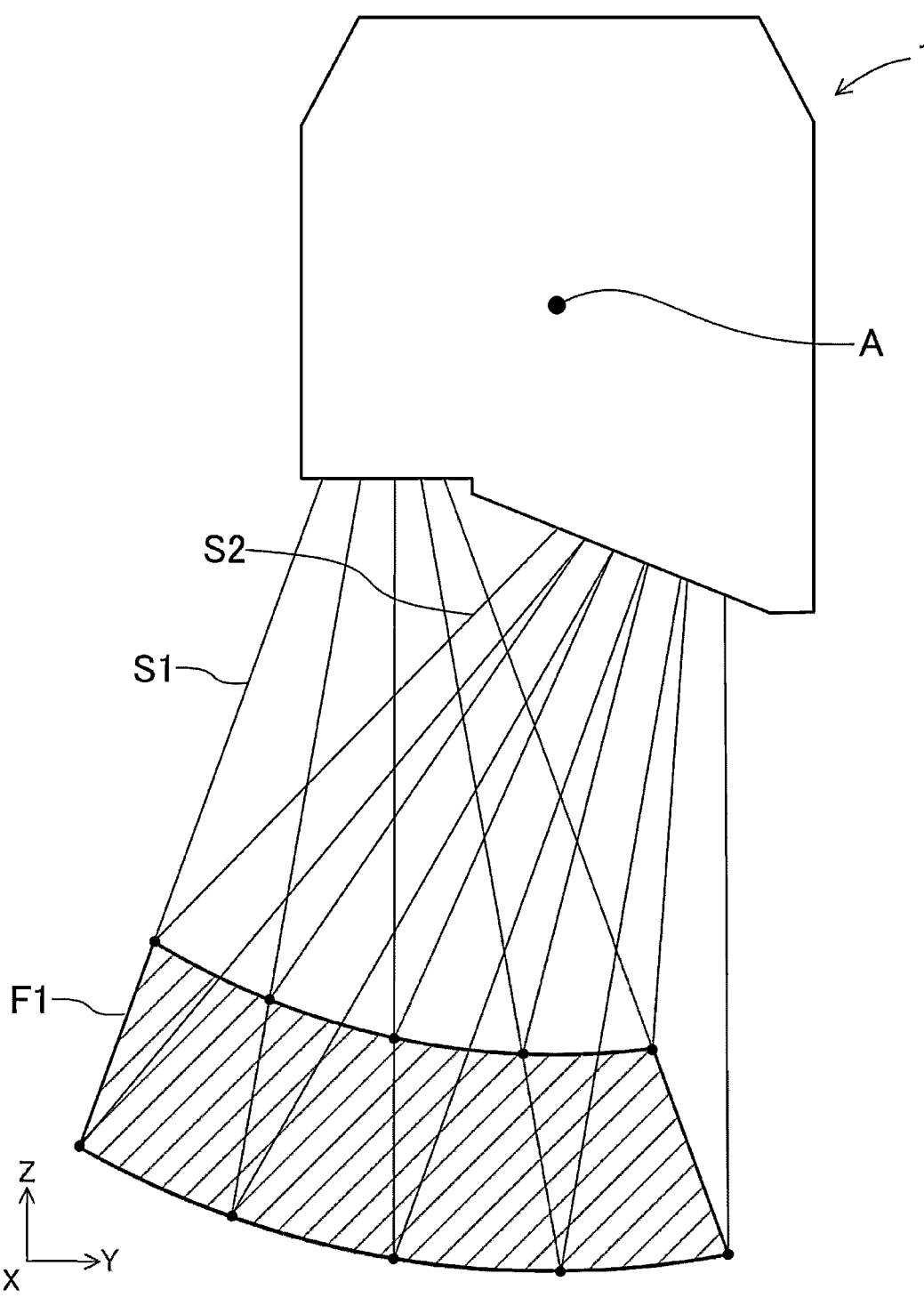
FIG. 10 is a diagram for explaining a shape of a measurement region.

FIG. 10 schematically illustrates a shape of a measurement region F1 of the optical displacement meter 1. In a case where the light projecting and receiving module 10 is rotated as in the first embodiment, the measurement region F1 is a region that is long in an arc shape with the rotation center line A of the light projecting and receiving module 10 as a center. Thus, when there are changes in angle information used for calculating the height and exposure timing, an error may occur in the height data.

Figure 11:
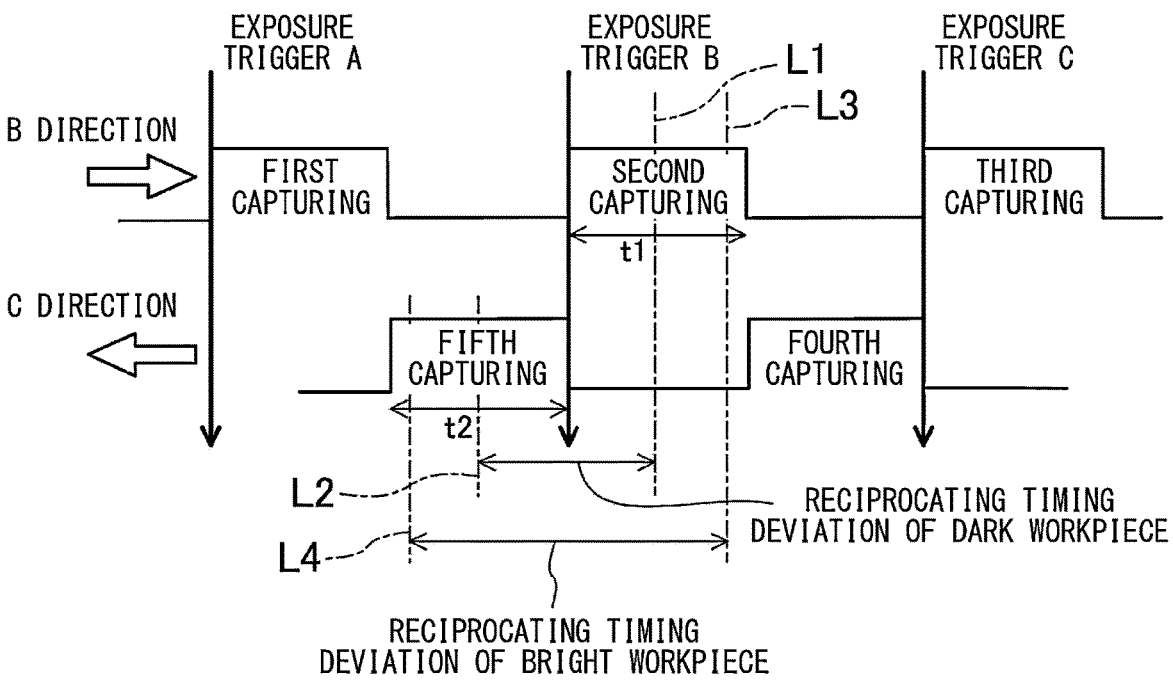
FIG. 11 is a timing chart illustrating an exposure timing in a case where the light projecting and receiving module is rotated in both directions.

FIG. 11 is a timing chart illustrating exposure timings in a case where the light projecting and receiving module 10 is rotated in the B direction in FIG. 4 and in a case where the light projecting and receiving module 10 is rotated in the C direction in FIG. 4. When the light projecting and receiving module 10 is rotating in the B direction, the light projecting unit 11 and the imaging unit 13 execute first capturing when the control unit 3 transmits an exposure trigger A to the light projecting unit 11 and the imaging unit 13, the light projecting unit 11 and the imaging unit 13 execute second capturing when the control unit transmits an exposure trigger B to the light projecting unit 11 and the imaging unit 13, and the light projecting unit 11 and the imaging unit 13 execute third capturing when the control unit transmits an exposure trigger C to the light projecting unit 11 and the imaging unit 13. Thereafter, when the rotation direction of the light projecting and receiving module 10 is switched to the C direction, the light projecting unit 11 and the imaging unit 13 execute fourth capturing when the control unit 3 transmits the exposure trigger C to the light projecting unit 11 and the imaging unit 13, and the light projecting unit 11 and the imaging unit 13 execute fifth capturing when the control unit 3 transmits the exposure trigger B to the light projecting unit 11 and the imaging unit 13.

Focusing on the second capturing and the fifth capturing, height measurement is performed in exposure periods t1 and t2, respectively. Specifically, although a reference angle θ1 at a timing at which the exposure trigger B is transmitted is acquired by the encoder 52, since the rotational motion continues during the exposure period t1, a peak position in the V direction of a light receiving amount distribution acquired by the control unit 3 corresponds to a height of the rotation angle (representative angle) θ2 at a timing in the middle of the exposure period. That is, when coordinate conversion is performed by using the reference angle θ1 and the measured peak position in the V direction, an error occurs in the height data. In addition, even though the workpiece is irradiated with the slit light at the same height due to the rotational movement during the exposure period t1, the position in the V direction to be exposed on the image sensor 13a changes. Note that, the reference angle θ1 is not limited to the timing at which the exposure trigger B is transmitted.

For example, in the case of a workpiece (dark workpiece) W having a diffusion surface, instantaneous rotation angles θ2 of lines L1 and L2 in the B direction and the C direction on average become representative angles corresponding to peak positions in the V direction obtained in the exposure periods t1 and t2, respectively. In the case of a workpiece (bright workpiece) W having a mirror surface, instantaneous rotation angles θ2 of lines L3 and L4 in the B direction and the C direction on average become representative angles corresponding to peak positions in the V direction obtained in the exposure periods t1 and t2, respectively. In the case of the dark workpiece W, the control unit 3 can set, as a representative angle θ2, a rotation angle at a substantially central point in time of the exposure period.

There are changes in angle information used for calculating the height and the exposure timing, and thus, the error occurs in the height data. However, in the present embodiment, in order to suppress the occurrence of the error, the control unit 3 is configured to estimate the representative angle θ2 at which the peak position in the V direction is acquired based on the control condition of the image sensor 13a or the motor 20 and the reference angle θ1 acquired by the encoder 52, and calculate the height of the workpiece W in the Z direction at the representative angle θ2 from the peak position.

The control condition of the image sensor 13a includes at least one of a trigger interval for starting the exposure period and a length of the exposure period. The control condition of the motor 20 includes at least one of an angular velocity of the motor 20, the rotation direction of the motor 20, or the number of times of reciprocation. The rotation direction of the motor 20 includes the B direction and the C direction in FIG. 4. The B direction may be referred to as forward rotation, and the C direction may be referred to as reverse rotation. Since a forward path of the swing motion corresponds to an odd-numbered measurement and a backward path corresponds to an even-numbered measurement, it is also possible to specify an orientation of the rotation direction of the motor 20 depending on whether the number of times of reciprocation is the even-numbered or the odd-numbered.

In the optical displacement meter 1, for example, a coordinate conversion condition (for example, coordinate conversion table) indicating a correspondence relationship between the UV coordinates, the rotation angle θ, and local coordinates (X, Y, Z) as expressed by (U, V, θ)=(X, Y, Z) is generated by calibration before shipment, and is stored in a storage unit. The control unit 3 calculates a correction value Δθ based on the control condition of the image sensor 13a or the motor 20, and estimates the representative angle θ2 based on the reference angle θ1 obtained by the encoder 52 and the correction value Δθ. The control unit 3 calculates local coordinates (X, Y, Z) based on values of U and V obtained by the measurement and the estimated representative angle θ2, and can measure the height of the workpiece W. As will be described later, the control unit 3 can change the correction value Δθdepending on, for example, the rotation direction.

In addition, a plurality of conversion conditions may be stored in the storage unit, and the control unit 3 can also measure the height of the workpiece W by using the conversion condition selected from the plurality of conversion conditions in accordance with the control condition without calculating the correction value Δθ. For example, the conversion table of (U, V, θ)=>(X, Y, Z) corresponding to the control condition of the image sensor 13a or the motor 20 is used, and thus, it is possible to accurately convert (X, Y, Z) corresponding to the angular velocity, the exposure period, and the exposure interval even with the same (U, V, θ).

In addition, the conversion condition can be prepared for each rotation direction of the motor 20. In a case where the angular velocity of the motor 20 can be changed, the conversion condition corresponding to each angular velocity can be prepared. For the exposure period and the exposure trigger interval of the image sensor 13a, when a plurality of settings can be performed, the conversion condition corresponding to each setting can also be prepared. Note that, in a case where there are a plurality of control conditions different from each other, each control condition may correspond to a different conversion condition, or a plurality of control conditions may correspond to a common conversion condition.

Figure 12:
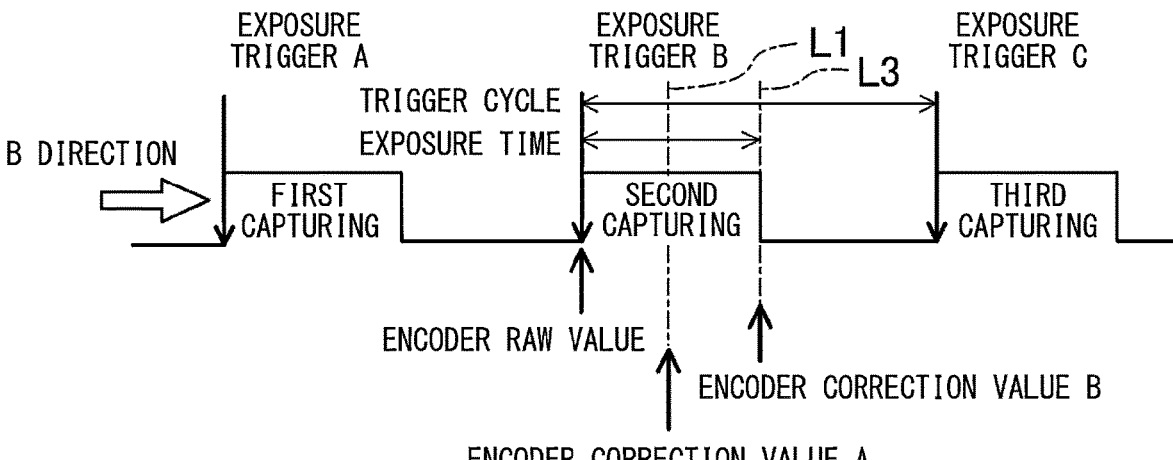
FIG. 12 is a timing chart illustrating a correction amount of an encoder correction value.

A specific calculation example of the correction value will be described with reference to FIG. 12. A time interval between the exposure trigger B and the exposure trigger C is set as a trigger cycle, and a time of the second capturing executed after the exposure trigger B is received is set as an exposure period. A start point in time of the second capturing can be acquired from the encoder 52 and becomes an encoder raw value. An encoder correction value A and an encoder correction value B can be calculated as follows.

$$\Delta\theta B = \theta\text{pitch} \times \text{exposure period/trigger cycle}$$

$$\Delta\theta A = \theta\text{pitch} \times \text{exposure period/trigger cycle} \times 0.5$$

θpitch: rotation angle pitch between exposure triggers (trigger cycles)

That is, when the encoder raw value is used as it is, since an error occurs, it is possible to correct the angle information to the angle information of the line L1 by calculating ΔθA in the above equation and adding ΔθA to the encoder raw value. In a case where the encoder raw value is corrected, the control unit 3 measures the height based on the peak position in the V direction (illustrated in FIG. 9) acquired under the control condition and the corrected rotation angle. Note that, the θpitch/trigger cycle corresponds to the angular velocity.

In a case where the rotation of the light projecting and receiving module 10 is a reciprocating motion, a place where the measurement is substantially performed on the way (for example, direction B illustrated in FIG. 4) and the way back (for example, direction C illustrated in FIG. 4) is deviated in both the Y direction and the Z direction. However, when the coordinate conversion is performed by using the representative angle θ2, accurate values in both the Y direction and the Z direction can be calculated. As described above, the control unit 3 determines the timing of the exposure trigger for driving the light projecting unit 11 and the imaging unit 13 based on the control condition, and drives the light projecting unit 11 and the imaging unit 13 by the exposure trigger. The control unit 3 can measure the height based on the data obtained by the light projecting unit 11 and the imaging unit 13 driven by the exposure trigger.

The optical displacement meter 1 according to the first embodiment has a high dynamic range (HDR) function within multiple exposure and one exposure period in order to cope with a change in light amount of the workpiece W. In a case where the encoder raw value is corrected by the method illustrated in FIG. 12, Δθ can be corrected in accordance with multiple exposure or another HDR method, for example.

Figure 13:
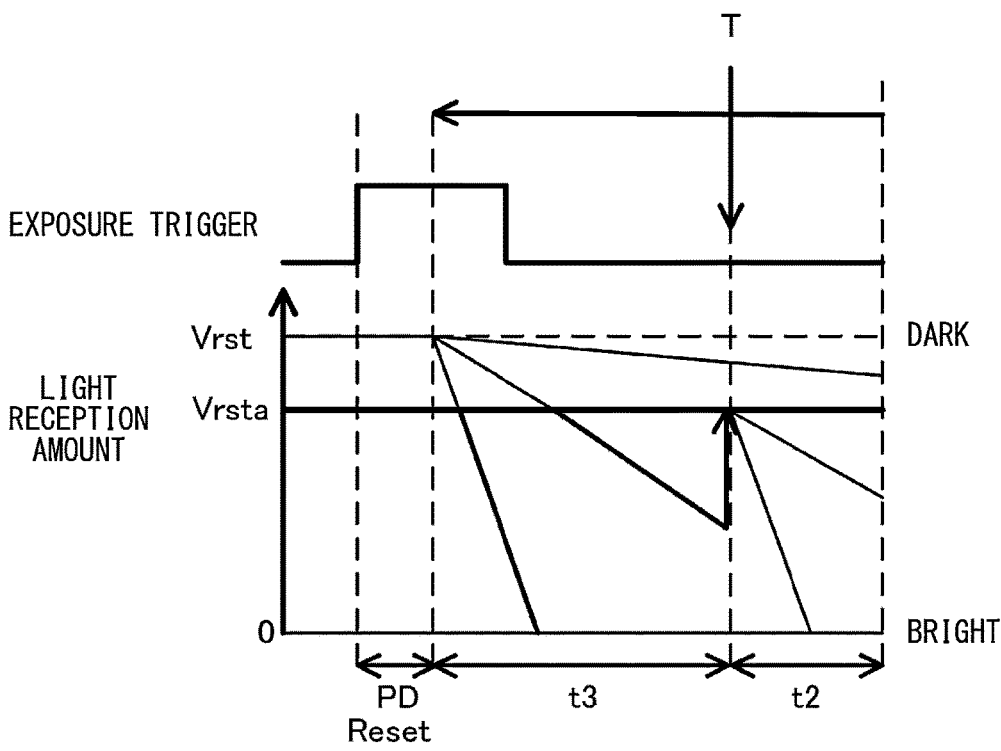
FIG. 13 is a diagram for explaining an example of HDR.

For example, as in the example illustrated in FIG. 13, the HDR function of monitoring, by the image sensor 13a, the light receiving amount of each pixel during the exposure period and executing exposure reset for a bright pixel of which the light receiving amount exceeds a threshold during the exposure period at a specific timing T can be applied to the optical displacement meter 1. In the case of the HDR illustrated in this drawing, a non-bright region can be corrected for a place (line L1 in FIG. 12) to be viewed in a time of (t3+t2)/2. On the other hand, the bright region can be corrected for a place (line L2 in FIG. 12) to be viewed in a time of t3+t2/2. That is, the control unit 3 estimates, as the representative angle θ2, the rotation angle at a substantially central point in time during the exposure period for the dark pixel, adjusts a light receiving amount equal to or more than the threshold at a predetermined point in time (t3) during the exposure period for the bright pixel, and estimates, as the representative angle, the rotation angle at and after the predetermined point in time. As described above, during the exposure period of the imaging unit 13, the control unit 3 can calculate the correction value by a calculation method different between the bright pixel of which the light receiving amount is equal to or more than the threshold and the dark pixel of which the light receiving amount is less than the threshold. In addition, the control unit 3 can set the correction value for the bright pixel to be more than the correction value for the dark pixel. In addition, the storage unit may include a coordinate conversion condition used for the bright pixel of which the light receiving amount is equal to or more than the threshold and a coordinate conversion condition used for the dark pixel of which the light receiving amount is less than the threshold.

Figure 14:
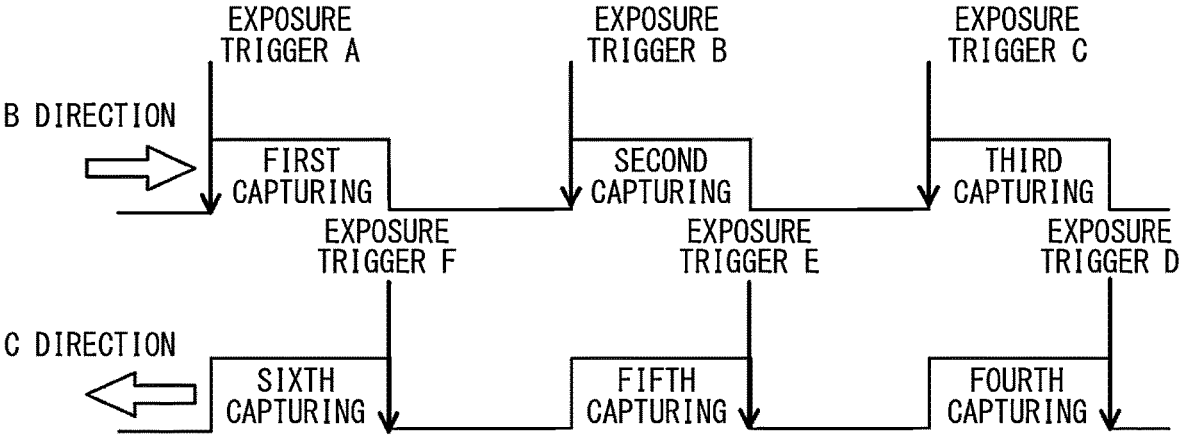
FIG. 14 is a timing chart for explaining a method for adjusting an exposure timing in a case where the light projecting and receiving module is rotated in both directions.

In addition, the control unit 3 can recognize the rotation direction of the motor 20 and adjust the correction value according to the recognized rotation direction. In a case where the rotation angles acquired by the encoder 52 are the same, the control unit 3 changes the correction value of the rotation angle depending on the rotation direction of the light projecting and receiving module 10. Specifically, as illustrated in FIG. 14, the control unit 3 can also adjust the exposure trigger timing such that exposure is performed in the same angle range in a state where the control conditions such as the exposure period and the trigger interval are grasped. In this case, exposure triggers D, E, and F are adjusted such that the first capturing, the second capturing, and the third capturing in a case where the light projecting and receiving module 10 is rotated in the B direction (first rotation direction) are exposed in the same angle range as the sixth capturing, the fifth capturing, and the fourth capturing in a case where the light projecting and receiving module is rotated in the C direction (second rotation direction), respectively. As described above, the control unit 3 is configured to determine the exposure trigger timing to scan in a first angle range from the first rotation direction and to scan in the first angle range from the second rotation direction opposite to the first rotation direction, and associate the height data obtained by scanning in the first angle range from the first rotation direction and the height data obtained by scanning in the first angle range from the second rotation direction with the same rotation angle. That is, the motor 20 rotates the image sensor 13$a$ in the first rotation direction and then rotates the image sensor 13$a$ in the second rotation direction opposite to the first rotation direction, and the control unit 3 controls a start timing of the first exposure period and a start timing of the second exposure period such that both a center of the angle range corresponding to the first exposure period during which the image sensor 13$a$ is rotating in the first rotation direction and a center of the angle range corresponding to the second exposure period during which the image sensor is rotating in the second rotation direction substantially coincide with the representative angle θ2.

The control unit 3 can obtain the representative angle θ2 by using the correction condition for correcting the reference angle θ1 obtained by the encoder 52 based on the control condition of the image sensor 13$a$ or the motor 20. Examples of the correction condition include a correction table as illustrated in FIG. 15. The correction table includes the encoder raw value, the correction value in the B direction, and the correction value in the C direction.

FIG. 16 is a graph showing a measurement error according to the invention and a comparative example. In this graph, the "invention" indicating a case where correction processing is executed and the "comparative example" indicating a case where the correction processing is not executed are shown. In the case of the comparative example, a peak is high and a valley is deep in the graph, and this case indicates that there is a large error occurring on the way and the way back when the measurement is performed by reciprocating the light projecting and receiving module 10. On the other hand, in the case of the invention, since the peak of the graph is significantly lower and the valley is significantly shallower than in the comparative example, it can be seen that the error occurring on the way and the way back is suppressed.

(First Modification of First Embodiment)

Figure 17:
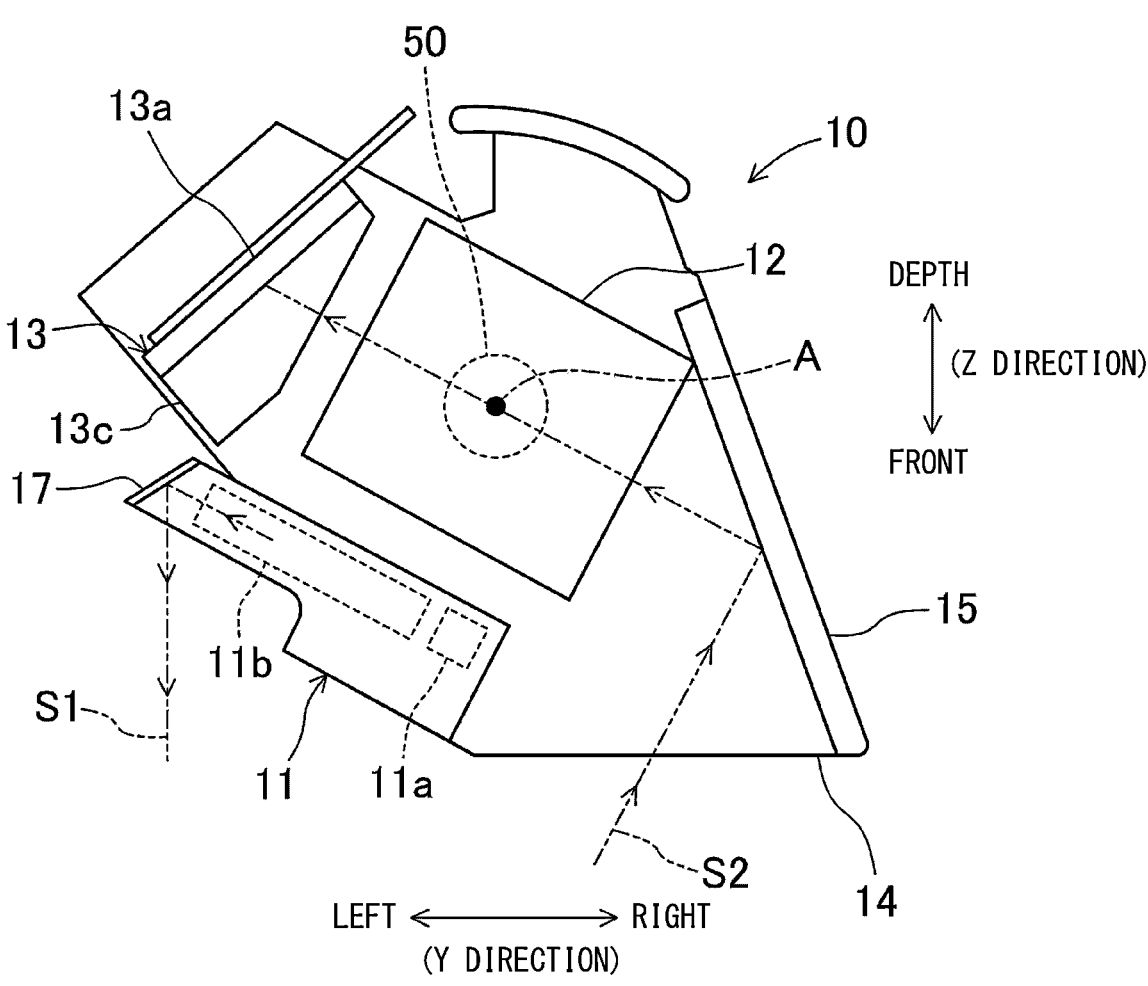
FIG. 17 is a diagram corresponding to FIG. 5 according to a first modification of the first embodiment.

FIG. 17 illustrates a light projecting and receiving module 10 according to a first modification of the first embodiment. The light projecting and receiving module 10 of the first modification is different from the light projecting and receiving module of the above embodiment in the positions of the light projecting unit 11, the light collecting unit 12, the imaging unit 13, and the light receiving side reflecting member 15. Specifically, the rotation shaft 50 of the light projecting and receiving module 10 is disposed at a position overlapping with the light collecting unit 12 on the YZ plane. That is, as described above, although it is desired to reduce the moment of inertia due to the rotation of the light projecting and receiving module 10 as much as possible, when the weight unit 16 indicated by a virtual line in FIG. 5 is provided, the weight of the light projecting and receiving module 10 may increase and it may be unpreferable. Thus, as a method for reducing the moment of inertia due to the rotation of the light projecting and receiving module 10 without providing the weight unit 16, it is possible to adopt a method for overlapping the light collecting unit 12 having a large weight and the rotation shaft 50 of the light projecting and receiving module 10 with each other on the YZ plane. As a result, at least a part of the light collecting unit 12 is disposed on an extension line of the rotation shaft 50 of the light projecting and receiving module 10. Note that, the rotation shaft 50 may not completely overlap with the light collecting unit 12, and at least a part of the rotation shaft 50 and at least a part of the light collecting unit 12 may be overlapped with each other as viewed from the direction of the rotation center line A. As a result, the weight unit 16 can be set to be unnecessary or the weight unit 16 can be set to be light.

In addition, in the first modification, the imaging unit 13 and the light receiving side reflecting member 15 are disposed to sandwich the light collecting unit 12. As a result, the light collecting unit 12 of the first modification is disposed on the optical path between the light receiving side reflecting member 15 and the imaging unit 13 on the YZ plane, and collects the light reflected by the light receiving side reflecting member 15 to be incident on the imaging unit 13.

Further, the light projecting and receiving module 10 of the first modification includes a light projecting side reflecting member 17. That is, the light projecting unit 11 of the first modification is disposed such that the slit light S1 emitted from the optical system 11$b$ is directed toward a left back side. As a result, the light projecting unit 11 can be close to the rotation center line A, and the moment of inertia due to the rotation of the light projecting and receiving module 10 can be further reduced. However, the workpiece W is positioned on the side opposite to the slit light S1 emitted from the optical system 11$b$. To cope with this, the light projecting side reflecting member 17 is disposed to reflect the slit light S1 emitted from the optical system 11$b$ of the light projecting unit 11 toward the workpiece W. The light projecting side reflecting member 17 is fixed to the support member 14 or the light projecting unit 11, and the relative positional relationship with respect to the light projecting unit 11 does not change even though the light projecting and receiving module 10 rotates.

(Second Modification of First Embodiment)

Figure 18:
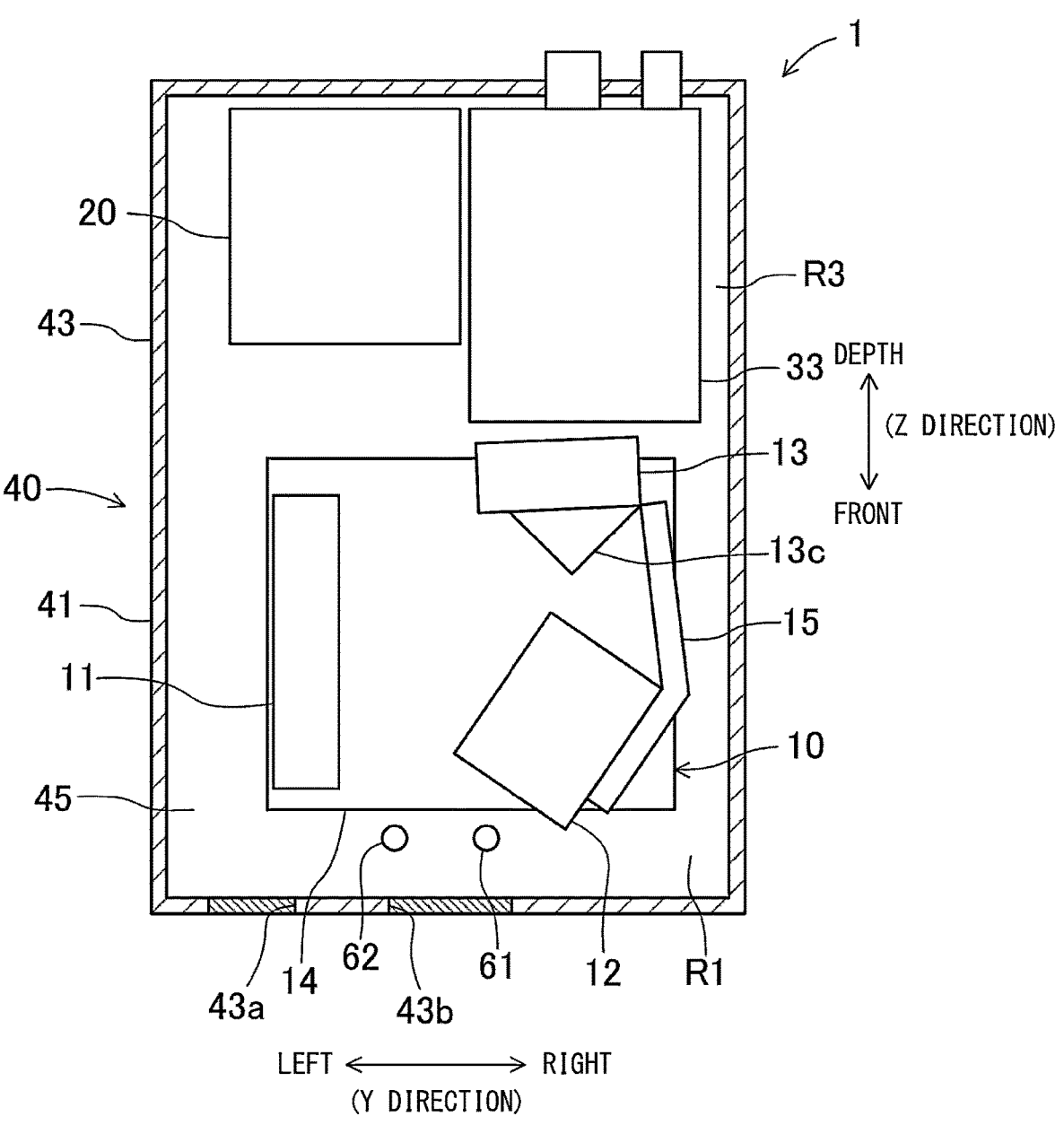
FIG. 18 is a diagram corresponding to FIG. 4 according to a second modification of the first embodiment.
Figure 19:
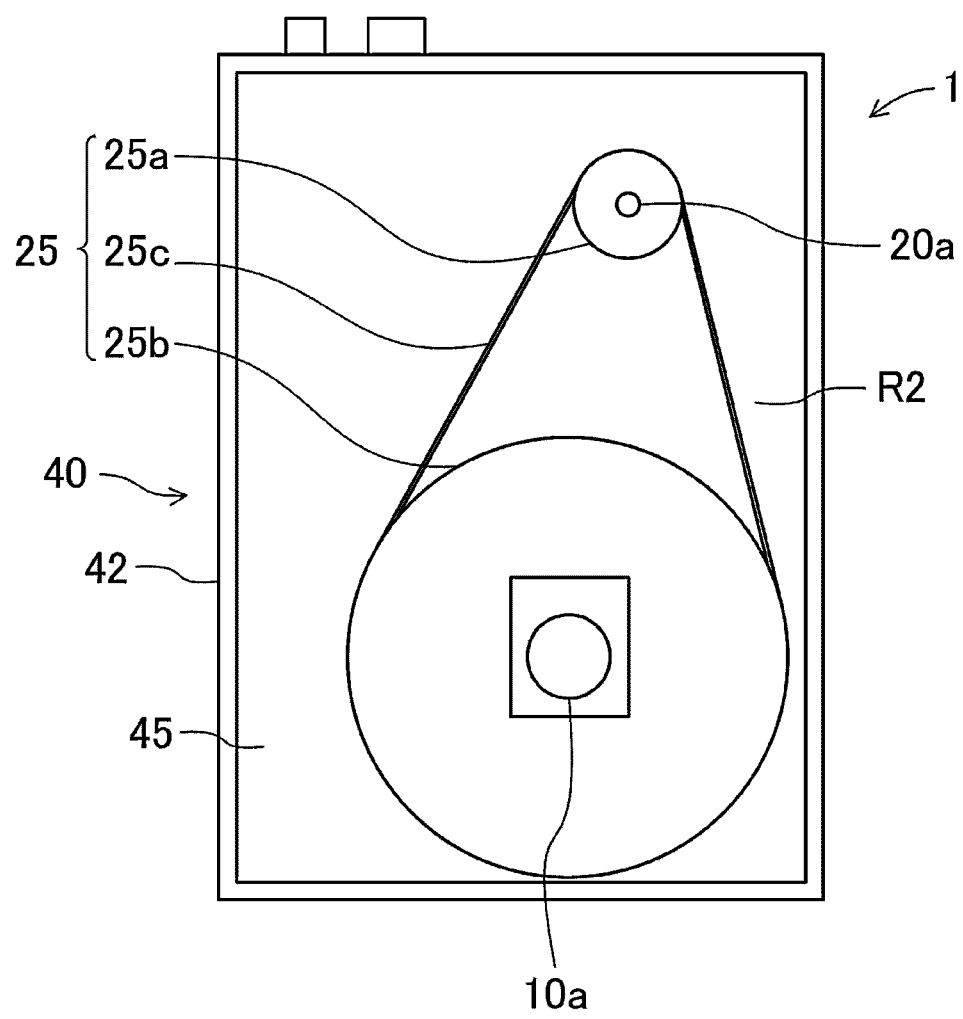
FIG. 19 is a diagram of an internal structure of an optical displacement meter according to the second modification of the first embodiment as viewed from below.

FIGS. 18 and 19 illustrate an optical displacement meter 1 according to a second modification of the first embodiment. FIG. 18 is a diagram of an internal structure of the optical displacement meter 1 as viewed from above, and FIG. 19 is a diagram of the internal structure of the optical displacement meter 1 as viewed from below.

In the optical displacement meter 1 of the second modification, the motor 20 is configured to rotate the light projecting and receiving module 10 via the speed reduction mechanism 25 instead of the direct drive motor. As illustrated in FIG. 18, the motor 20 is stored in the upper space R1 together with the light projecting and receiving module 10. As illustrated in FIG. 19, an output shaft 20*a* of the motor 20 penetrates the board portion 45 downward and reaches the lower space R2. In addition, a driven shaft 10*a* fixed to the light projecting and receiving module 10 also penetrates the board portion 45 downward and reaches the lower space R2.

The speed reduction mechanism 25 is stored in the lower space R2 and includes a driving pulley 25*a* fixed to the output shaft 20*a* of the motor 20, a driven pulley 25*b* fixed to the driven shaft 10*a*, and a transmission belt 25*c* wound around the driving pulley 25*a* and the driven pulley 25*b*. The driving pulley 25*a* is smaller in diameter than the driven pulley 25*b*. The transmission belt 25*c* is a timing belt.

In the second modification, when the output shaft 20*a* of the motor 20 stored in the upper space R1 rotates, the driving pulley 25*a* rotates, and a rotational force of the driving pulley 25*a* is transmitted to the driven pulley 25*b* via the transmission belt 25*c*. Since a driving force transmitted to the driven pulley 25*b* is transmitted to the driven shaft 10*a*, the light projecting and receiving module 10 can be rotated by the motor 20. In the case of the second modification, the driven shaft 10*a* is the rotation shaft of the light projecting and receiving module 10.

Note that, the speed reduction mechanism 25 is not limited to the combination of the pulleys 25*a* and 25*b* and the transmission belt 25*c*, and may include by, for example, a combination of a drive sprocket, a driven sprocket, and a timing chain, or a combination of a plurality of gears. For example, a DC motor, a stepping motor, a servo motor, or the like can be used as a type of the motor 20.

Second Embodiment

Figure 20:
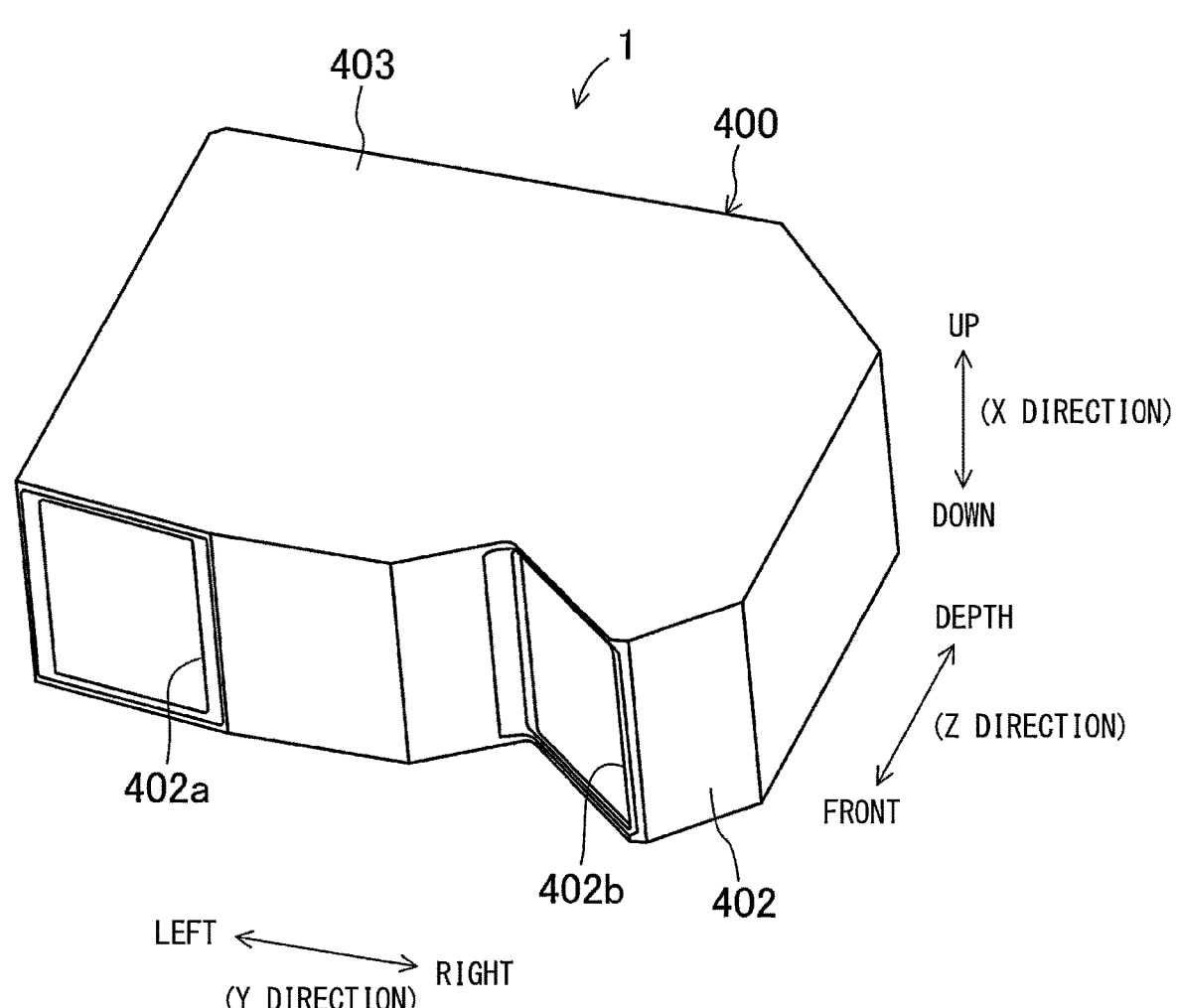
FIG. 20 is a diagram corresponding to FIG. 2 according to a second embodiment.
Figure 21:
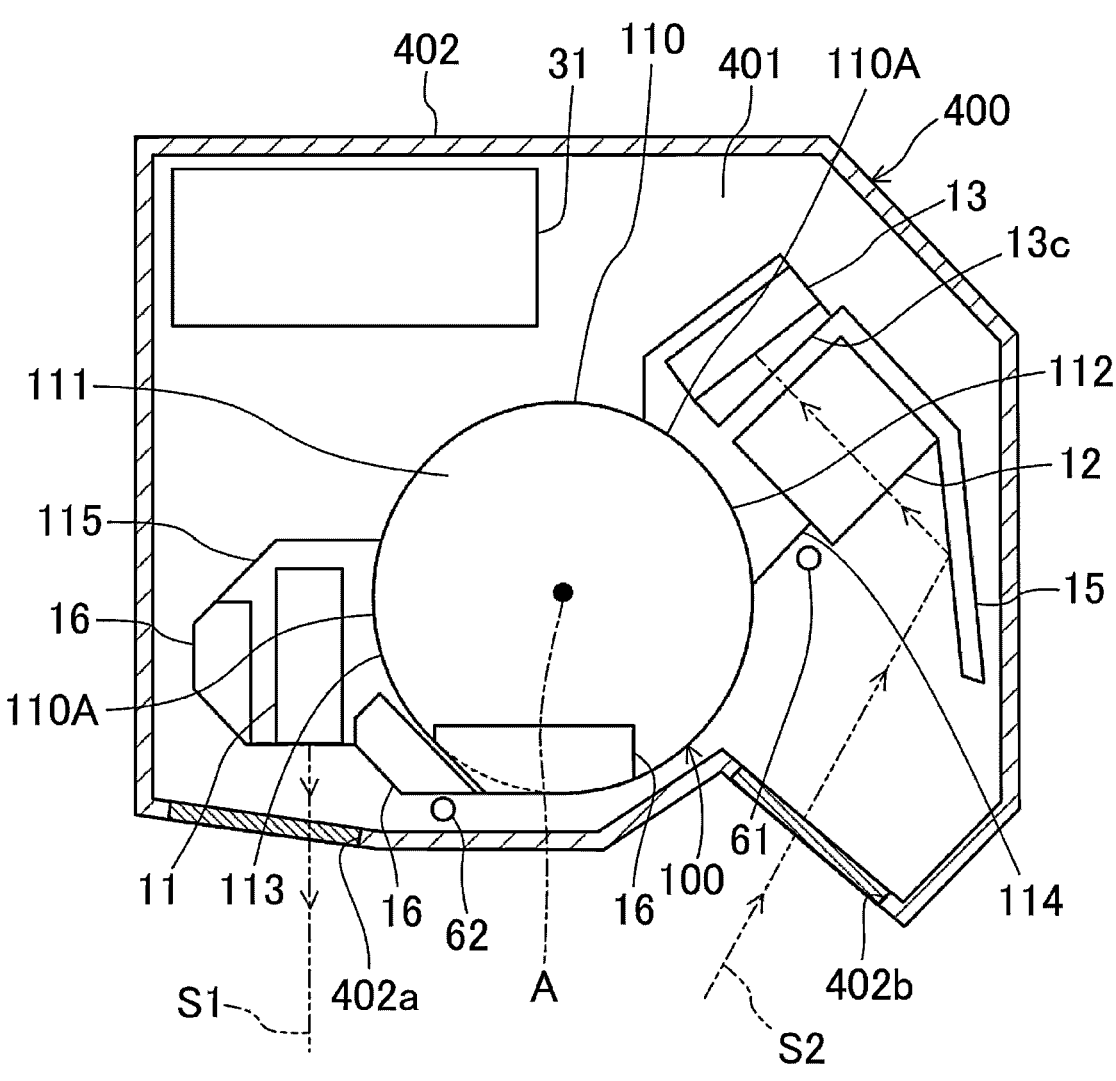
FIG. 21 is a diagram of an internal structure of an optical displacement meter according to the second embodiment as viewed from above.
Figure 22:
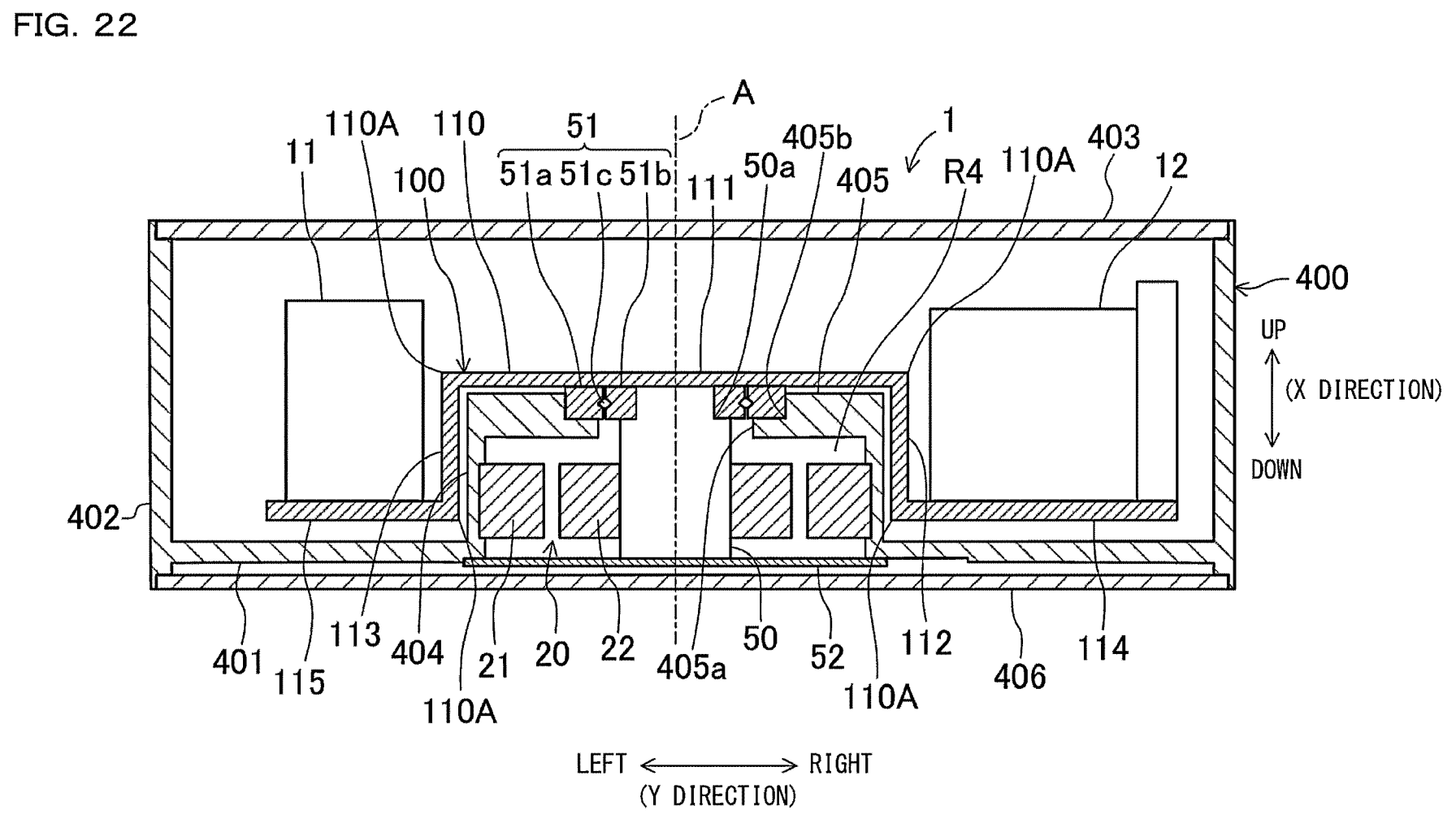

FIGS. 20 to 22 illustrate an optical displacement meter 1 according to a second embodiment of the invention. The second embodiment is different from the first embodiment in a structure of a housing 400, a positional relationship between the motor 20 and a light projecting and receiving module 100, and the like. Hereinafter, the same portions as the portions in the first embodiment will be denoted by the same reference numerals, description thereof will be omitted, and different portions will be described in detail.

As illustrated in FIGS. 20 and 22, the housing 400 has a one-stage structure, and the boards 31, 33, and 35 are also stored inside the housing 400. An inside of the housing 400 is partitioned, and thus, a space in which the boards 31, 33, and 35 are stored and a space in which the light projecting and receiving module 100 is stored can be set to be different from each other.

The housing 400 includes a lower wall 401, a peripheral wall 402 extending upward from a peripheral edge portion of the lower wall 401, and a lower lid member 403 for closing an upper open portion. A light projecting window 402*a* through which the slit light S1 emitted from the light projecting unit 11 is transmitted and a light receiving window 402*b* through which the reflected light S2 reflected from the workpiece W is transmitted are provided in a front portion of the peripheral wall 402.

As illustrated in FIG. 22, an annular wall 404 protruding to the inside of the housing 400 and extending about the rotation center line A is formed at a central portion of the lower wall 401. An end wall 405 extending in a radial direction of the rotation center line A is formed at a distal end portion of the annular wall 404. An opening 405*a* into which the rotation shaft 50 is inserted is formed in a central portion of the end wall 405.

A motor storing space R4 is formed inside the annular wall 404. The stator 21 and the rotor 22 of the motor 20 are stored in the motor storing space R4. The stator 21 of the motor 20 is fixed to an inner surface of the annular wall 404. That is, in the present embodiment, the annular wall 404 and the end wall 405 constitute a stator holding portion. On the other hand, the rotor 22 of the motor 20 is fixed to the rotation shaft 50.

The outer ring member 51*a* of the bearing 51 is fixed to the end wall 405 in a state of being fitted in a step portion 405*b* formed in the end wall 405. As a result, the bearing 51 is held by the stator holding portion constituted by the annular wall 404 and the end wall 405. On the other hand, the inner ring member 51*b* is fitted to the fitting portion 50*a* formed in the rotation shaft 50.

The encoder 52 is also stored in the motor storing space R4. A lower lid member 406 is provided at a lower end portion of the housing 400. Since the motor storing space R4 is sealed by the lower lid member 406, dust or the like is prevented from adhering to the encoder 52.

As in the first embodiment, although the light projecting and receiving module 100 includes the light projecting unit 11, the light collecting unit 12, the imaging unit 13, the weight unit 16, and the like, a support member 110 integrally holding the light projecting unit 11, the light collecting unit 12, and the imaging unit 13 is greatly different from the support member 14 of the first embodiment.

That is, in the first embodiment, the light projecting and receiving module 10 and the motor 20 (the bearing 51 and the encoder 52) are aligned in the direction of the rotation shaft 50 (height direction), whereas in the second embodiment, at least one of the motor 20, the bearing 51 supporting the rotation shaft 50, or the encoder 52 connected to the motor 20 is included in a part within the height range in the direction of the rotation shaft 50 of the light projecting and receiving module 100. As a result, when a positional relationship between the light projecting unit 11 and the light collecting unit 12 of the light projecting and receiving module 100 is set, it is possible to design in consideration of increasing the interval between the light projecting unit 11 and the light collecting unit 12, for example, as in a case where the installation distance is relatively long.

More specifically, the support member 110 includes a fixing portion 111 fixed to the rotation shaft 50, a one-side vertical plate portion 112 and an other-side vertical plate portion 113, a light collecting unit holding portion 114, and a light projecting unit holding portion 115. The fixing portion 111, the one-side vertical plate portion 112, the other-side vertical plate portion 113, the light collecting unit holding portion 114, and the light projecting unit holding portion 115 may be integrally formed, or may be formed by combining different members.

The fixing portion 111 has a plate shape extending in the radial direction of the rotation shaft 50. In this embodiment, the fixing portion has a circular shape as illustrated in FIG. 21, and is disposed to cover the end wall 405 from above as illustrated in FIG. 22. The one-side vertical plate portion 112 extends downward along the direction of the rotation shaft 50 from a right side in FIG. 22, that is, from one side in the radial direction of the rotation shaft 50 in the fixing portion 111. The other-side vertical plate portion 113 extends downward along the direction of the rotation shaft 50 from a left side in FIG. 22, that is, from the other side in the radial direction of the rotation shaft 50 in the fixing portion 111. The one-side vertical plate portion 112 and the other-side vertical plate portion 113 are disposed to face the annular wall 404. In addition, the one-side vertical plate portion 112 and the other-side vertical plate portion 113 are curved in an arc shape similarly to the annular wall 404, and rotate in a state where a constant gap with the annular wall 404 is maintained at the time of rotation of the light projecting and receiving module 100.

Note that, the one-side vertical plate portion 112 and the other-side vertical plate portion 113 may be integrally formed. For example, it is also possible to form an annular peripheral wall (not illustrated) extending downward from the peripheral edge portion of the fixing portion 111, and it is also possible to form the one-side vertical plate portion 112 and the other-side vertical plate portion 113 in a part of the peripheral wall in the circumferential direction.

The light collecting unit holding portion 114 has a plate shape extending in the radial direction of the rotation shaft 50 from the lower end portion of the one-side vertical plate portion 112. The light collecting unit 12, the imaging unit 13, the cover glass 13c, and the like are held on an upper surface of the light collecting unit holding portion 114. Thus, the rotation shaft 50 of the light projecting and receiving module 100 is disposed at a position not overlapping with the light collecting unit 12 and the imaging unit 13 on the YZ plane.

The light projecting unit holding portion 115 has a plate shape extending in the radial direction of the rotation shaft 50 from a lower end portion of the other-side vertical plate portion 113. The light projecting unit 11, the weight unit 16, and the like are held on an upper surface of the light projecting unit holding portion 115. Thus, the rotation shaft 50 of the light projecting and receiving module 100 is disposed at a position not overlapping with the light projecting unit 11 on the YZ plane.

As described above, the light collecting unit holding portion 114 and the light projecting unit holding portion 115 are disposed to sandwich the rotation shaft 50, and protrude in directions opposite to each other with respect to the radial direction of the rotation shaft 50. The weight unit 16 can be fixed to the light projecting unit holding portion 115. In addition, the weight unit 16 may be fixed to the side of the fixing portion 111 opposite to the side where the one-side vertical plate portion 112 is formed.

The support member 110 having the fixing portion 111, the one-side vertical plate portion 112, the other-side vertical plate portion 113, the light collecting unit holding portion 114, and the light projecting unit holding portion 115 has a plurality of bent portions 110A in a section in the X direction. As described above, since the support member 110 has the structure having the plurality of bent portions 110A, the rigidity can be enhanced as compared with a case where the support member 110 is a flat plate.

The motor 20 and the bearing 51 are disposed between the one-side vertical plate portion 112 and the other-side vertical plate portion 113 of the support member 110. The bearing 51 is disposed at a location closer to the fixing portion 111 than the motor 20 between the one-side vertical plate portion 112 and the other-side vertical plate portion 113. As a result, the motor 20 and the bearing 51 are included in a part within the height range of the light projecting and receiving module 100. Note that, although not illustrated, only the motor 20 may be included within the height range of the light projecting and receiving module 100, or only the bearing 51 may be included within the height range of the light projecting and receiving module 100.

At least the motor 20, the bearing 51, and the encoder 52 constitute a rotation drive unit. In addition, the motor 20 is fixed to a wall surface (the lower wall 401 and the annular wall 404) adjacent to a light projecting and receiving surface on which the light projecting window 402a through which the slit light passes and the light receiving window 402b through which the reflected light passes (collectively referred to as a light projecting and receiving window).

The light projecting and receiving window of the present embodiment includes the light projecting window 402a and the separate light receiving window 402b, but the light projecting window and the light receiving window may be integrally formed. In addition, the light projecting and receiving surface is a surface, on which the light projecting and receiving window, among surfaces constituting an outer shape of the housing 400, and is a surface including a plurality of planes formed by the windows as illustrated in FIGS. 4 and 14. In a case where the light projecting and receiving window is integrally formed, the light projecting and receiving surface may be a surface including one plane formed by the light projecting and receiving window.

The support member 110 supports the light projecting and receiving module 100 such that the light projecting and receiving module 100 is positioned in a plane orthogonal to the X direction and in which the rotation drive unit is present. The support member 110 has a first portion (for example, the fixing portion 111) and second portions (for example, the light collecting unit holding portion 114 and the light projecting unit holding portion 115) having different heights in the rotation shaft direction formed by the plurality of bent portions 110A, and the rotation drive unit and the light projecting and receiving module 100 are present between the plane formed by the first portion and the plane formed by the second portion in at least a part of the section including the rotation shaft. With this configuration, the rigidity of the support member 110 can be enhanced, and a thickness of the housing 400 in the X direction can be reduced.

Although not illustrated, the encoder 52 may be included within the height range of the light projecting and receiving module 100. For example, the encoder 52 is provided at the intermediate portion or the upper end portion of the rotation shaft 50, and thus, the encoder 52 is included within the height range of the light projecting and receiving module 100. Only the encoder 52 may be included within the height range of the light projecting and receiving module 100, only the motor 20 and the encoder 52 may be included within the height range of the light projecting and receiving module 100, or only the bearing 51 and the encoder 52 may be included within the height range of the light projecting and receiving module 100.

The light receiving side reflecting member 15 is disposed on an optical path between the light collecting unit 12 and the light receiving window 402b of the housing 400 on the YZ plane, and reflects the reflected light S2 transmitted through the light receiving window 402b toward the light collecting unit 12. That is, the light collecting unit 12 is disposed on the optical path between the light receiving side reflecting member 15 and the imaging unit 13 on the YZ plane, and collects the reflected light S2 reflected by the light receiving side reflecting member 15 to be incident on the imaging unit 13. As a result, the reflected light S2 can be folded back toward the light projecting unit 11 such that a distance between the imaging unit 13 or the light collecting unit 12 and the rotation shaft 50 of the light projecting and receiving module 100 on the YZ plane is shortened.

(Modification of Second Embodiment)

Figure 23:
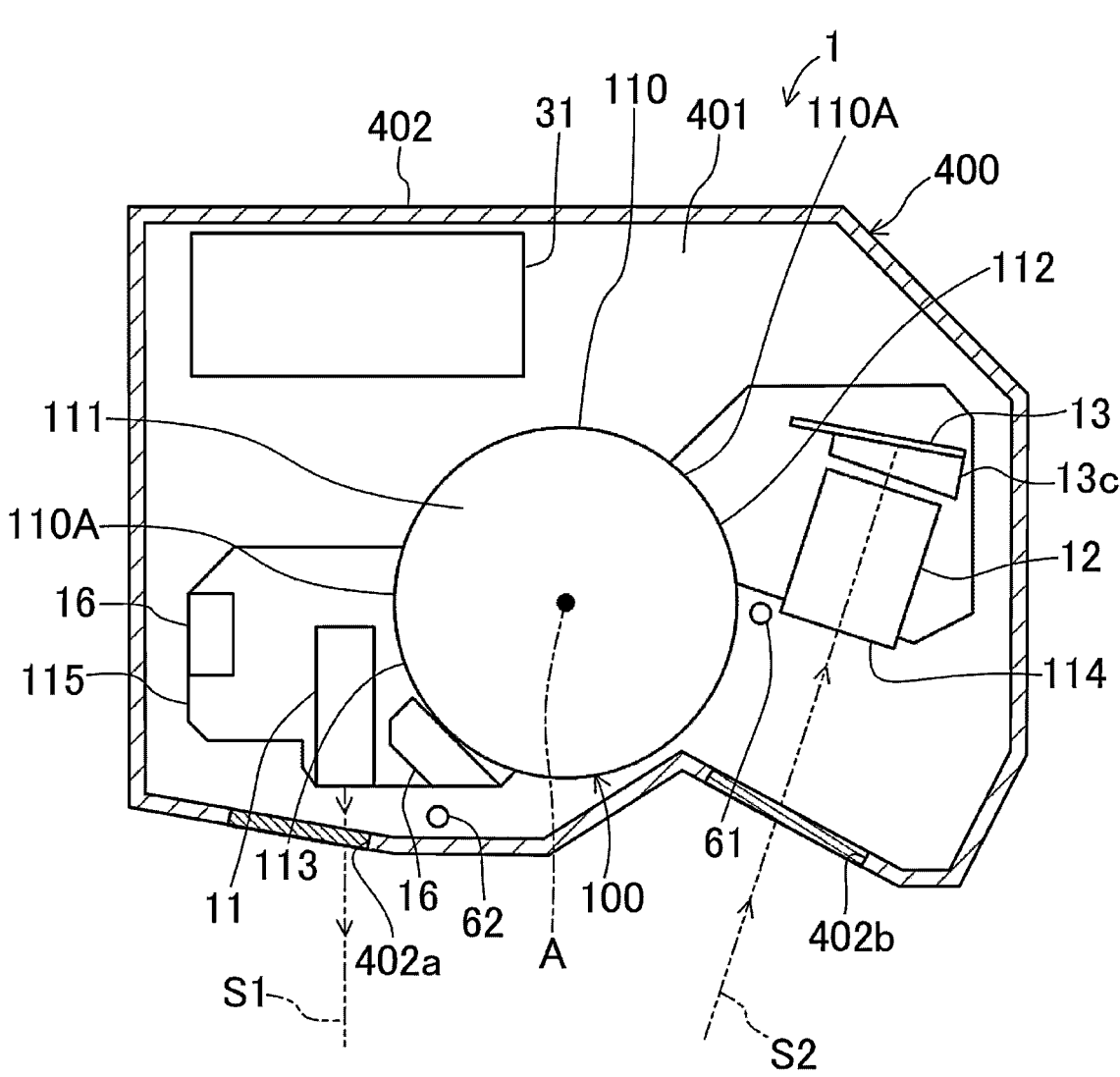
FIG. 23 is a diagram corresponding to FIG. 21 according to a modification of the second embodiment.

FIG. 23 illustrates an optical displacement meter 1 according to a modification of the second embodiment. In this modification, the light receiving side reflecting member 15 is omitted. The light collecting unit 12 is disposed such that the optical axis of the light collecting unit 12 faces the light receiving window 402b of the housing 400, and thus, the light receiving side reflecting member 15 becomes unnecessary.

In addition, this modification is an example of a layout in a case where a wide interval between the light projecting unit 11 and the light collecting unit 12 is secured. For example, the present modification can be applied to a case where the installation distance is relatively long.

The above-described embodiment are merely examples in all respects, and should not be construed in a limiting manner. Further, all modifications and changes falling within an equivalent scope of the claims are within the scope of the invention. For example, in the second embodiment, the light projecting side reflecting member may be provided. In addition, in the second embodiment, the speed reduction mechanism may be provided. In addition, in the first and second embodiments, the motor 20 may be provided outside the housings 40 and 400. In addition, the correction processing illustrated in FIGS. 12 and 14 is also applicable to the second embodiment.

As described above, the optical displacement meter according to the disclosure can be used, for example, in a case where three-dimensional shape data of a workpiece is acquired.

What is claimed is:

1. An optical displacement meter comprising:

a projecting unit that irradiates a workpiece with slit light extending in an X direction;

an image sensor that has a plurality of pixels two-dimensionally arrayed in a U direction corresponding to the X direction and a V direction orthogonal to the U direction, and outputs a light receiving amount distribution of reflected light from the workpiece by the plurality of pixels;

a motor that integrally rotates the light projecting unit and the image sensor;

a control unit that controls the motor, causes the slit light to scan in a direction orthogonal to the X direction, and causes the image sensor to expose for a plurality of exposure periods while rotating the image sensor in the direction; and a rotation angle acquisition unit that acquires a reference angle for each of the plurality of exposure periods of the image sensor, wherein the control unit acquires a peak position in the V direction of the light receiving amount distribution acquired by accumulating charges in the plurality of pixels while rotating the image sensor during a respective exposure period, and estimates a representative angle at which the peak position is acquired based on the reference angle corresponding to the respective exposure period and a control condition of the image sensor or the motor, and calculates a height of the workpiece in a Z direction at the representative angle from the peak position.

2. The optical displacement meter according to claim 1, wherein the rotation angle acquisition unit acquires the reference angle at a start point in time of the respective exposure period.

3. The optical displacement meter according to claim 1, wherein the control condition of the image sensor includes at least one of a length of the respective exposure period or an interval of a trigger which starts the respective exposure period, and the control condition of the motor includes at least one of an angular velocity, a rotation direction, or the number of times of reciprocation of the motor.

4. The optical displacement meter according to claim 1, wherein the motor rotates the image sensor in a first rotation direction, and then rotates the image sensor in a second rotation direction opposite to the first rotation direction, and the control unit estimates representative angles different from each other even in a case where the reference angle acquired by the rotation angle acquisition unit is the same between the first rotation direction and the second rotation direction.

5. The optical displacement meter according to claim 1, wherein the control unit estimates, as the representative angle, a rotation angle at a substantially central point in time of the respective exposure period.

6. The optical displacement meter according to claim 1, wherein, in a case where the plurality of pixels include both a bright pixel of which the light receiving amount is equal to or more than a threshold during the respective exposure period and a dark pixel of which the light receiving amount is less than the threshold, the control unit differentiates estimation methods of the representative angle for the bright pixel and the dark pixel.

7. The optical displacement meter according to claim 6, wherein the control unit estimates, as the representative angle, a rotation angle at a substantially central point in time during the respective exposure period for the dark pixel, and adjusts the light receiving amount equal to or more than the threshold in a predetermined point in time during the respective exposure period and estimates, as the representative angle, a rotation angle at and after the predetermined point in time.

8. The optical displacement meter according to claim 1, further comprising:

a storage unit that stores a plurality of conversion conditions for converting UV coordinates and a rotation angle into XYZ coordinates in accordance with the control condition of the image sensor or the motor, wherein the control unit converts the UV coordinates and the reference angle into XYZ coordinates corresponding to the representative angle based on a conversion condition selected in accordance with the control condition of the image sensor or the motor.

9. The optical displacement meter according to claim 8, wherein the plurality of conversion conditions include a conversion condition used for the dark pixel of which the light receiving amount exceeds the threshold during the respective exposure period and a conversion condition used for the dark pixel of which the light receiving amount does not exceed the threshold, and in a case where the plurality of pixels include both the bright pixel and the dark pixel in the respective exposure period, the control unit selects any one of the conversion condition used for the bright pixel and the conversion condition used for the dark pixel for each pixel based on the threshold.

10. The optical displacement meter according to claim 1, wherein the motor rotates the image sensor in a first rotation direction, and then rotates the image sensor in a second rotation direction opposite to the first rotation direction, and the control unit controls a start timing of a first exposure period during which the image sensor is rotating in the first rotation direction and a start timing of a second exposure period during which the image sensor is rotating in the second rotation direction such that both a center of an angle range corresponding to the first exposure period and a center of an angle range corresponding to the second exposure period substantially coincide with the representative angle.

11. An optical displacement meter comprising:

a projecting unit that irradiates a workpiece with slit light extending in an X direction;

an image sensor that has a plurality of pixels two-dimensionally arrayed in a U direction corresponding to the X direction and a V direction orthogonal to the U direction, and outputs a light receiving amount distribution of reflected light from the workpiece by the plurality of pixels;

a motor that integrally rotates the light projecting unit and the image sensor;

a control unit that controls the motor, causes the slit light to scan in a direction orthogonal to the X direction, and exposes the image sensor while rotating the image sensor in the direction; and a rotation angle acquisition unit that acquires a reference angle corresponding to an exposure period of the image sensor, wherein the control unit:

acquires a peak position in the V direction of the light receiving amount distribution acquired by accumulating charges in the plurality of pixels while rotating the image sensor during the exposure period, and estimates a representative angle at which the peak position is acquired based on the reference angle corresponding to the exposure period and a control condition of the image sensor or the motor, and calculates a height of the workpiece in a Z direction at the representative angle from the peak position, wherein the control condition of the image sensor includes at least one of a length of the exposure period or an interval of a trigger which starts the exposure period, and the control condition of the motor includes at least one of an angular velocity, a rotation direction, or the number of times of reciprocation of the motor.

12. The optical displacement meter according to claim 11, wherein the rotation angle acquisition unit acquires the reference angle at a start point in time of the exposure period.

13. The optical displacement meter according to claim 11, wherein the motor rotates the image sensor in a first rotation direction, and then rotates the image sensor in a second rotation direction opposite to the first rotation direction, and the control unit estimates representative angles different from each other even in a case where the reference angle acquired by the rotation angle acquisition unit is the same between the first rotation direction and the second rotation direction.

14. The optical displacement meter according to claim 11, wherein the control unit estimates, as the representative angle, a rotation angle at a substantially central point in time of the exposure period.

15. The optical displacement meter according to claim 11, wherein, in a case where the plurality of pixels include both a bright pixel of which the light receiving amount is equal to or more than a threshold during the exposure period and a dark pixel of which the light receiving amount is less than the threshold, the control unit differentiates estimation methods of the representative angle for the bright pixel and the dark pixel.

16. The optical displacement meter according to claim 15, wherein the control unit estimates, as the representative angle, a rotation angle at a substantially central point in time during the exposure period for the dark pixel, and adjusts the light receiving amount equal to or more than the threshold in a predetermined point in time during the exposure period and estimates, as the representative angle, a rotation angle at and after the predetermined point in time.

17. The optical displacement meter according to claim 11, further comprising:

a storage unit that stores a plurality of conversion conditions for converting UV coordinates and a rotation angle into XYZ coordinates in accordance with the control condition of the image sensor or the motor, wherein the control unit converts the UV coordinates and the reference angle into XYZ coordinates corresponding to the representative angle based on a conversion condition selected in accordance with the control condition of the image sensor or the motor.

18. The optical displacement meter according to claim 17, wherein the plurality of conversion conditions include a conversion condition used for the dark pixel of which the light receiving amount exceeds the threshold during the exposure period and a conversion condition used for the dark pixel of which the light receiving amount does not exceed the threshold, and in a case where the plurality of pixels include both the bright pixel and the dark pixel in the exposure period, the control unit selects any one of the conversion condition used for the bright pixel and the conversion condition used for the dark pixel for each pixel based on the threshold.

19. The optical displacement meter according to claim 11, wherein the motor rotates the image sensor in a first rotation direction, and then rotates the image sensor in a second rotation direction opposite to the first rotation direction, and the control unit controls a start timing of a first exposure period during which the image sensor is rotating in the first rotation direction and a start timing of a second exposure period during which the image sensor is rotating in the second rotation direction such that both a center of an angle range corresponding to the first exposure period and a center of an angle range corresponding to the second exposure period substantially coincide with the representative angle.

* * * * *